United States Patent
Fu et al.

(10) Patent No.: US 11,363,677 B2
(45) Date of Patent: Jun. 14, 2022

(54) INTEGRATED ACCESS SYSTEM, CONFIGURATION METHOD, AND BASEBAND UNIT

(71) Applicant: HUAWEI TECHNOLOGIES CO., LTD., Guangdong (CN)

(72) Inventors: Weixiang Fu, Chengdu (CN); Xingguo Wu, Shanghai (CN); Liguang Mo, Hangzhou (CN); Qiaoming Zhang, Dongguan (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/712,096

(22) Filed: Dec. 12, 2019

(65) Prior Publication Data
US 2020/0120754 A1    Apr. 16, 2020

Related U.S. Application Data

(63) Continuation of application No. PCT/CN2017/087964, filed on Jun. 12, 2017.

(51) Int. Cl.
*H04W 88/08* (2009.01)
*H04W 56/00* (2009.01)
(Continued)

(52) U.S. Cl.
CPC ......... *H04W 88/085* (2013.01); *H04L 7/0012* (2013.01); *H04W 56/001* (2013.01); *H04W 80/08* (2013.01); *H04W 88/181* (2013.01)

(58) Field of Classification Search
CPC .. H04W 88/085; H04W 56/001; H04L 7/0012
See application file for complete search history.

(56) References Cited

U.S. PATENT DOCUMENTS

| 2004/0185907 | A1 | 9/2004 | Lange | |
| 2013/0227172 | A1* | 8/2013 | Zheng | H04J 3/0658 709/248 |

(Continued)

FOREIGN PATENT DOCUMENTS

| CN | 101150348 A | 3/2008 |
| CN | 101159933 A | 4/2008 |

(Continued)

OTHER PUBLICATIONS

Office Action issued in Japanese Application No. 2019-568332 dated Mar. 2, 2021, 8 pages (with English translation).

(Continued)

*Primary Examiner* — Hoon J Chung
(74) *Attorney, Agent, or Firm* — Fish & Richardson P.C.

(57) ABSTRACT

Example integrated access systems, configuration methods, and baseband units are described. One example integrated access system includes a first baseband unit (BBU), a second BBU, a first data exchange unit, a first base station network management subsystem, a second base station network management subsystem, and a first pico remote radio unit (pRRU). The first BBU is connected to the first data exchange unit, the first BBU is connected to the first base station network management subsystem, the first BBU is connected to the second BBU, the second BBU is connected to the second base station network management subsystem, and the first pRRU is connected to the first data exchange unit.

12 Claims, 21 Drawing Sheets

(51) Int. Cl.
  *H04L 7/00*     (2006.01)
  *H04W 80/08*    (2009.01)
  *H04W 88/18*    (2009.01)

(56)        References Cited

U.S. PATENT DOCUMENTS

| | | | |
|---|---|---|---|
| 2014/0029431 | A1 | 1/2014 | Haberland et al. |
| 2015/0110234 | A1* | 4/2015 | Yu .................. H04L 7/0331 375/376 |
| 2015/0245245 | A1 | 8/2015 | Chakrabarti et al. |
| 2015/0257160 | A1* | 9/2015 | Ishida ............. H04W 72/0486 455/452.1 |
| 2016/0295572 | A1* | 10/2016 | Hahn ............... H04W 72/0413 |
| 2018/0059712 | A1* | 3/2018 | Kazehaya ............. H03K 5/135 |
| 2018/0248787 | A1* | 8/2018 | Rajagopal ........... H04W 72/087 |

FOREIGN PATENT DOCUMENTS

| | | | |
|---|---|---|---|
| CN | 101257339 A | 9/2008 | |
| CN | 102264161 A | 11/2011 | |
| WO | WO 2015/069057 A1 * | 5/2015 | ............. H04B 7/26 |
| WO | 2015122200 A1 | 8/2015 | |

OTHER PUBLICATIONS

PCT International Search Report and Written Opinion in International Application No. PT/CN2017/087,964, dated Feb. 24, 2018, 15 pages (With English Translation).

Huawei Technologies, "AtomCell9.0 LampSite Solution White Paper",Issue VI, XP055602650,Jan. 9, 2015, 36 pages.

Partial Supplementary European Search Report issued in European Application No. dated May 4, 2020, 19 pages.

Office Action issued in Chinese Application No. 201780089663.7 dated Jun. 7, 2021, 8 pages.

* cited by examiner

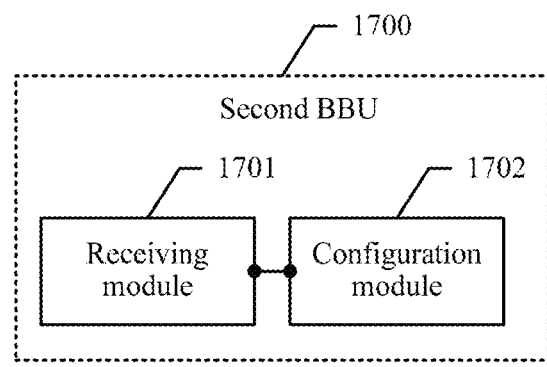
FIG. 17
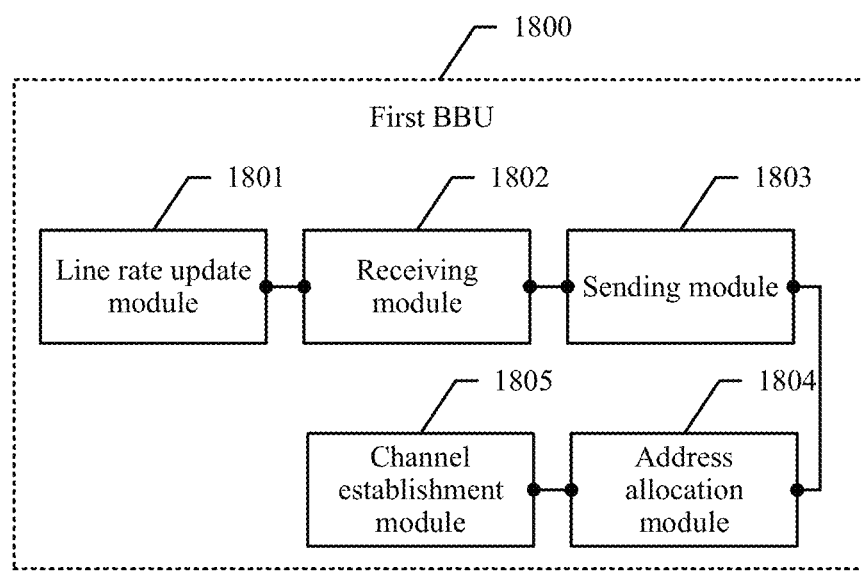
FIG. 18-a

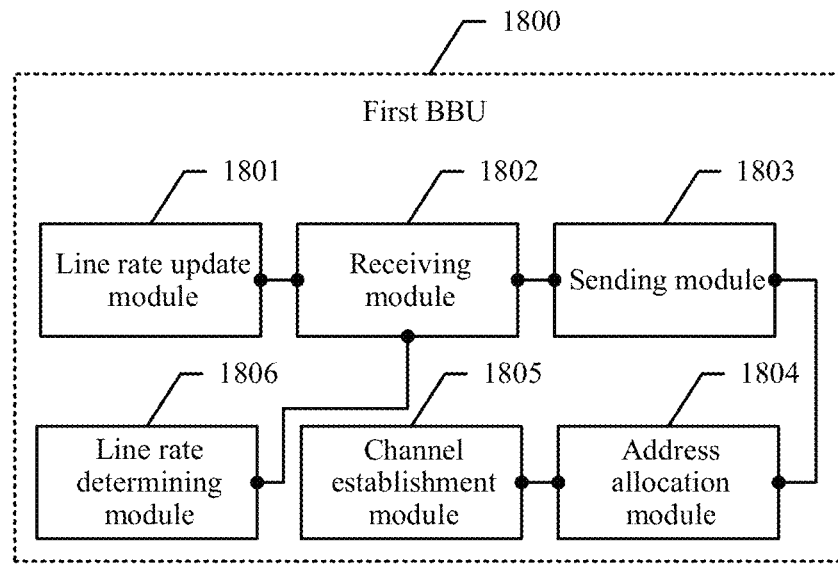
FIG. 18-b
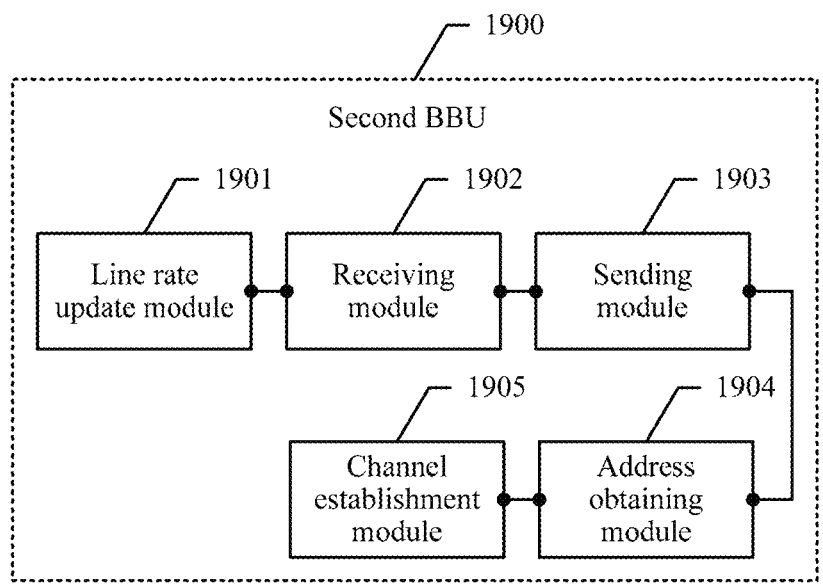
FIG. 19-a

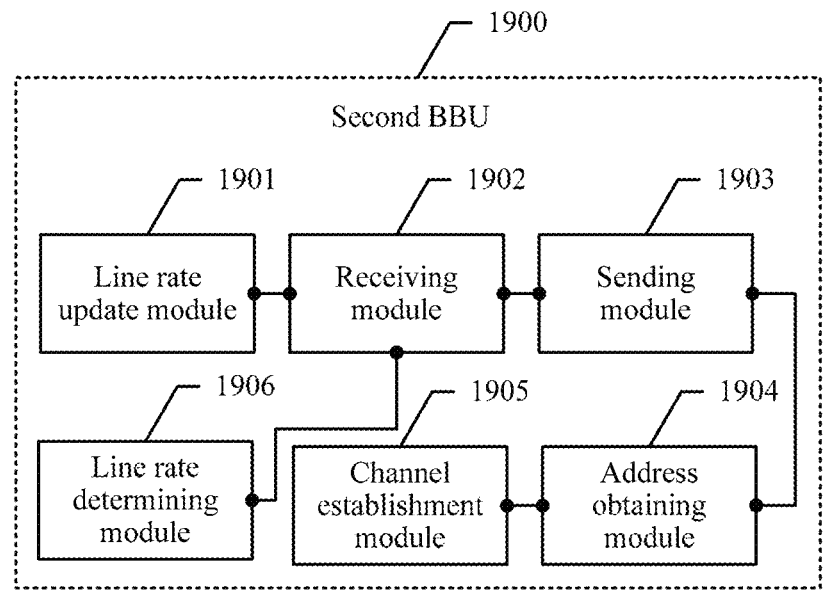
FIG. 19-b
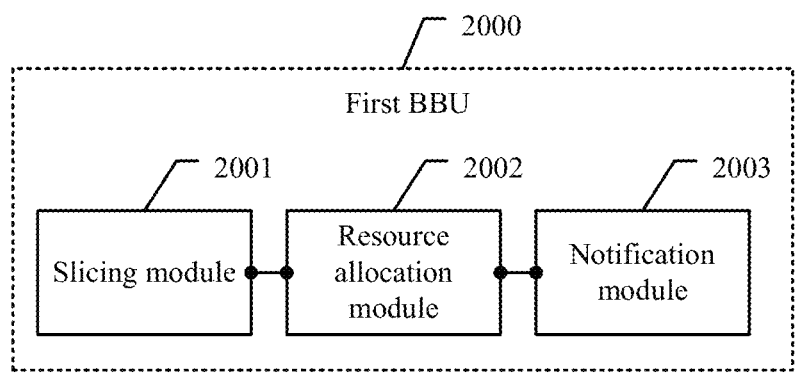
FIG. 20

INTEGRATED ACCESS SYSTEM, CONFIGURATION METHOD, AND BASEBAND UNIT

CROSS-REFERENCE TO RELATED APPLICATIONS

This application is a continuation of International Application No. PCT/CN2017/087964, filed on Jun. 12, 2017, the disclosure of which is hereby incorporated by reference in its entirety.

TECHNICAL FIELD

Embodiments of this application relate to the communications field, and in particular, to an integrated access system, a configuration method, and a baseband unit.

BACKGROUND

A radio dot system (Lampsite) is an indoor coverage solution. LampSite is mainly dedicated to indoor coverage of mobile broadband data. Through digitalization of indoor coverage, construction and maintenance costs of indoor coverage are greatly reduced, and mobile broadband experience is improved.

With the rapid development of the mobile communication market, a user increasingly expects to access a high-quality communications network anytime and anywhere. Therefore, a mobile communication service provider starts to dispose repeaters outdoors, inside a building, underground, and in another blind area difficult to be covered by an electric wave, to meet a requirement of the user for a call service to a maximum extent. An integrated access system implemented based on LampSite is a dedicated distributed system architecture that supports a plurality of standards and a plurality of frequency bands. As shown in FIG. 1, a current integrated access system further includes a plurality of product function modules, such as a baseband unit (BBU), a data exchange unit (which is also referred to as an RHUB), a pico remote radio unit (pRRU), a base station network management subsystem, and the like.

The BBU serves as a convergence node. The BBU is connected to the RHUB, the base station network management subsystem is connected to the BBU, and the RHUB is connected to the pRRU. The BBU is configured to perform centralized control and management on an entire base station system. The RHUB implements communication between the BBU and the pRRU, and the pRRU implements a radio frequency signal processing function.

At least the following technical problems exist in the current integrated access system: As a cell capability of the BBU increases, the BBU connects the RHUB and the base station network management subsystem as a convergence node. An operator may configure and manage a baseband resource by using the base station network management subsystem. In the prior art, a radio frequency resource and a baseband resource of the BBU are managed by using a same base station network management subsystem. As a result, configuration and management of different resources cannot be decoupled, and service activation and service upgrade cannot be decoupled, either. Consequently, both reliability and maintainability of the integrated access system are low in the prior art.

SUMMARY

Embodiments of this application provide an integrated access system, a configuration method, and a baseband unit, to implement internal decoupling of the integrated access system, and improve reliability and maintainability of the integrated access system.

According to a first aspect, an embodiment of this application provides an integrated access system, including a first baseband unit BBU, a second BBU, a first data exchange unit, a first base station network management subsystem, a second base station network management subsystem, and a first pico remote radio unit pRRU. The first BBU is connected to the first data exchange unit, the first BBU is connected to the first base station network management subsystem, and the first BBU is connected to the second BBU. The second BBU is connected to the second base station network management subsystem. The first pRRU is connected to the first data exchange unit.

In this embodiment of this application, the integrated access system includes two types of BBUs: the first BBU and the second BBU. The first BBU and the second BBU are connected to communicate with each other. In addition, the first BBU is connected to the first base station network management subsystem, and the second BBU is connected to the second base station network management subsystem. Therefore, a radio frequency resource of the first BBU may be separately configured and managed by using the first base station network management subsystem, and a baseband resource of the second BBU may be separately configured and managed by using the second base station network management subsystem. In this way, a radio frequency resource and a baseband resource can be independently managed, and reliability and maintainability of the integrated access system are greatly improved.

In a possible design of this embodiment of this application, the integrated access system further includes a third BBU and a third base station network management subsystem. The first BBU is connected to the third BBU, and the third BBU is connected to the third base station network management subsystem. In the foregoing embodiment of this application, in the integrated access system, the first BBU is disposed as a host BBU, and both the second BBU and the third BBU are disposed as client BBUs. In addition, the second BBU and the third BBU are connected to respective base station network management subsystems. For example, the second BBU is connected to the second base station network management subsystem, and the third BBU is connected to the third base station network management subsystem. Therefore, in a scenario in which a plurality of operators establish a network together and share a network resource after establishment, the different operators may separately use the second base station network management subsystem and the third base station network management subsystem, thereby implementing asset decoupling, operation and maintenance decoupling, and service activation and upgrade decoupling between the plurality of operators.

In a possible design of this embodiment of this application, the integrated access system further includes a fourth BBU, a second data exchange unit, a fourth base station network management subsystem, and a second pRRU. The fourth BBU is connected to the second data exchange unit, the fourth BBU is connected to the fourth base station network management subsystem, the fourth BBU is connected to the second BBU, and the second pRRU is connected to the second data exchange unit. In the integrated access system, both the first BBU and the fourth BBU may serve as host BBUs. For example, the first BBU and the fourth BBU may be separately in different buildings. The first BBU and the fourth BBU may be separately connected to the second BBU through different fiber channels. The second BBU may be disposed in a central equipment room, to support an inter-subrack connection between a client BBU and a plurality of host BBUs, so that one central equipment room covers a plurality of surrounding buildings.

According to a second aspect, an embodiment of this application further provides a configuration method based on an integrated access system. The integrated access system includes a first baseband unit BBU and a second BBU, and the first BBU is connected to the second BBU. The method includes: obtaining, by the first BBU, first clock synchronization information, where the first clock synchronization information includes a clock frequency and a clock phase of the first BBU; and sending, by the first BBU, the first clock synchronization information to the second BBU. The first BBU may send the first clock synchronization information to the second BBU, so that the second BBU can configure local clock information of the second BBU based on the first clock synchronization information, thereby implementing inter-subrack clock synchronization between BBUs. For example, a BBU mode is configured. Through an OM channel of a base station network management subsystem, the first BBU may be configured as a host BBU mode, and the second BBU may be configured as a client BBU mode. Inter-subrack convergence of a plurality of BBUs is supported, so that a plurality of operators access different BBUs, thereby resolving a problem of operation and maintenance decoupling between the operators, and implementing future large-capacity evolution based on BBU access. In addition, inter-subrack connection between a plurality of host BBUs and a plurality of client BBUs is supported in this embodiment of this application, so that one central equipment room covers a plurality of surrounding buildings.

In a possible design of this embodiment of this application, the integrated access system further includes a third BBU, the third BBU is connected to the first BBU, and the method further includes: sending, by the first BBU, the first clock synchronization information to the third BBU. When the first BBU is connected to two client BBUs as a host BBU, after the first BBU obtains the first clock synchronization information, the first BBU may separately send the first clock synchronization information to the second BBU and the third BBU, so that the third BBU, as a client BBU, can also receive the first clock synchronization information of the first BBU. The third BBU may use the first clock synchronization information to correct a local clock source of the third BBU, thereby implementing inter-subrack clock synchronization between BBUs.

According to a third aspect, an embodiment of this application further provides a configuration method based on an integrated access system. The integrated access system includes a first baseband unit BBU and a second BBU, and the first BBU is connected to the second BBU. The method includes: receiving, by the second BBU, first clock synchronization information sent by the first BBU, where the first clock synchronization information includes a clock frequency and a clock phase of the first BBU; and configuring, by the second BBU, local clock information of the second BBU based on the first clock synchronization information. The first BBU may send the first clock synchronization information to the second BBU, so that the second BBU can configure the local clock information of the second BBU based on the first clock synchronization information, thereby implementing inter-subrack clock synchronization between BBUs.

In a possible design of this embodiment of this application, the integrated access system further includes a fourth BBU, the fourth BBU is connected to the second BBU, and the method further includes: receiving, by the second BBU, second clock synchronization information sent by the fourth BBU, where the second clock synchronization information includes a clock frequency and a clock phase of the fourth BBU; and the configuring, by the second BBU, local clock information of the second BBU based on the first clock synchronization information includes: configuring, by the second BBU, the local clock information of the second BBU based on the first clock synchronization information and the second clock synchronization information. In addition to receiving the first clock synchronization information, the second BBU receives the second clock synchronization information of the fourth BBU. The second BBU may parse the second clock synchronization information to obtain the clock frequency and the clock phase of the fourth BBU. When both the second BBU and the fourth BBU serve as host BBUs, the second BBU and the fourth BBU may separately send the clock synchronization information to the second BBU serving as a client BBU, and the second BBU may separately obtain the clock frequency and the clock phase of the first BBU, and the clock frequency and the clock phase of the fourth BBU.

In a possible design of this embodiment of this application, the configuring, by the second BBU, the local clock information of the second BBU based on the first clock synchronization information and the second clock synchronization information includes: selecting, by the second BBU, clock synchronization information with higher clock quality from the first clock synchronization information and the second clock synchronization information, and configuring the local clock information of the second BBU based on the clock synchronization information with higher clock quality. The second BBU may select the clock synchronization information with higher clock quality from the clock synchronization information separately sent by the first BBU and the fourth BBU to the second BBU, and configure the local clock information of the second BBU based on the clock synchronization information with higher clock quality, so as to ensure that the second BBU uses clock information with high clock quality.

According to a fourth aspect, an embodiment of this application further provides a configuration method based on an integrated access system. The integrated access system includes a first baseband unit BBU and a second BBU, the first BBU is connected to the second BBU, and the method includes: updating, by the first BBU, a first line rate, and sending a data frame to the second BBU at an updated first line rate after each update; receiving, by the first BBU, a data frame that is sent by the second BBU at an updated second line rate after each time the second BBU updates a second line rate; when the first line rate is equal to the second line rate, sending, by the first BBU, networking relationship information of the first BBU to the second BBU at the first line rate, and receiving networking relationship information of the second BBU that is sent by the second BBU at the second line rate; allocating, by the first BBU, a communication address to the second BBU based on the networking relationship information of the second BBU, and sending a communication address of the first BBU to the second BBU; and establishing, by the first BBU, a bidirectional upper-layer communication channel with the second BBU based on the communication address of the second BBU. The first BBU and the second BBU may perform line rate auto-negotiation. The first BBU allocates the communication address to the second BBU, and the second BBU may obtain the communication address of the first BBU. The first BBU establishes the bidirectional upper-layer communication channel with the second BBU based on the communication address of the second BBU. Through line rate auto-negotiation, networking relationship information exchange, and communication address allocation, the upper-layer communication channel may be automatically established between the first BBU and the second BBU without manual configuration, thereby reducing manual costs and decreasing an error probability. For example, an upper-layer communication channel is automatically established between a host BBU and a client BBU, thereby reducing a configuration workload of service personnel and complexity of site setup.

In a possible design of this embodiment of this application, when the first line rate is equal to the second line rate, the method further includes: sending, by the first BBU, line rate capability information of the first BBU to the second BBU at the first line rate; receiving, by the first BBU, line rate capability information of the second BBU that is sent by the second BBU at the second line rate; and determining, by the first BBU based on the line rate capability information of the first BBU and the line rate capability information of the second BBU, a line rate used for performing physical layer communication between the first BBU and the second BBU. Line rate capability information is a maximum transmission capability of a BBU on a physical layer channel. The first BBU and the second BBU exchange the respective line rate capability information, and then determine, based on the line rate capability information of the first BBU and the line rate capability information of the second BBU, the line rate used for performing physical layer communication between the first BBU and the second BBU. For example, a maximum line rate in an intersection set of the line rate capability information of the first BBU and the line rate capability information of the second BBU may be selected as the line rate used for performing physical layer communication between the first BBU and the second BBU, so as to implement line rate auto-negotiation without occupying manual resources to perform manual configuration.

In a possible design of this embodiment of this application, the updating, by the first BBU, a first line rate includes: updating, by the first BBU, the first line rate based on a first period, where the first period and a second period are different periods, and the second period is a period based on which the second BBU updates the second line rate. Both the first BBU and the second BBU update respective line rate values based on respective periods, and the first period and the second period are different periods. Therefore, there is necessarily a longer period and a shorter period in the first period and the second period. The first BBU and the second BBU periodically update respective line rates, so as to attempt blind line rate matching between the first BBU and the second BBU, thereby implementing line rate auto-negotiation without occupying manual resources to perform manual configuration.

According to a fifth aspect, an embodiment of this application further provides a configuration method based on an integrated access system. The integrated access system includes a first baseband unit BBU and a second BBU, the first BBU is connected to the second BBU, and the method includes: updating, by the second BBU, a second line rate, and sending a data frame to the first BBU at an updated second line rate after each update; receiving, by the second BBU, a data frame that is sent by the first BBU at an updated first line rate after each time the first BBU updates a first line rate; when the second line rate is equal to the first line rate, sending, by the second BBU, networking relationship information of the second BBU to the first BBU at the second line rate, and receiving networking relationship information of the first BBU that is sent by the first BBU at the first line rate; obtaining, by the second BBU, a communication address of the first BBU; and establishing, by the second BBU, a bidirectional upper-layer communication channel with the first BBU based on the communication address of the first BBU. The first BBU and the second BBU may perform line rate auto-negotiation. The first BBU allocates a communication address to the second BBU, and the second BBU may obtain the communication address of the first BBU. The first BBU establishes the bidirectional upper-layer communication channel with the second BBU based on the communication address of the second BBU. Through line rate auto-negotiation, networking relationship information exchange, and communication address allocation, the upper-layer communication channel may be automatically established between the first BBU and the second BBU without manual configuration, thereby reducing manual costs and decreasing an error probability.

In a possible design of this embodiment of this application, when the second line rate is equal to the first line rate, the method further includes: sending, by the second BBU, line rate capability information of the second BBU to the first BBU at the second rate; receiving, by the second BBU, line rate capability information of the first BBU that is sent by the first BBU at the first line rate; and determining, by the second BBU based on the line rate capability information of the second BBU and the line rate capability information of the first BBU, a line rate used for performing physical layer communication between the first BBU and the second BBU. Line rate capability information is a maximum transmission capability of a BBU on a physical layer channel. The first BBU and the second BBU exchange the respective line rate capability information, and then determine, based on the line rate capability information of the first BBU and the line rate capability information of the second BBU, the line rate used for performing physical layer communication between the first BBU and the second BBU. For example, a maximum line rate in an intersection set of the line rate capability information of the first BBU and the line rate capability information of the second BBU may be selected as the line rate used for performing physical layer communication between the first BBU and the second BBU, so as to implement line rate auto-negotiation without occupying manual resources to perform manual configuration.

In a possible design of this embodiment of this application, the updating, by the second BBU, a second line rate includes: updating, by the second BBU, the second line rate based on a second period, where the second period and a first period are different periods, and the first period is a period based on which the first BBU updates the first line rate. Both the first BBU and the second BBU update respective line rate values based on respective periods, and the first period and the second period are different periods. Therefore, there is necessarily a longer period and a shorter period in the first period and the second period. The first BBU and the second BBU periodically update respective line rates, so as to attempt blind line rate matching between the first BBU and the second BBU, thereby implementing line rate auto-negotiation without occupying manual resources to perform manual configuration.

According to a sixth aspect, an embodiment of this application further provides a configuration method based on an integrated access system. The integrated access system includes a first baseband unit BBU, a second BBU, a first data exchange unit, a second base station network management subsystem, and a first pico remote radio unit pRRU.

The first BBU is separately connected to the second BBU and the first data exchange unit, the first data exchange unit is connected to the first pRRU, and the second BBU is connected to the second base station network management subsystem. The method includes: performing, by the first BBU, slicing processing on a resource corresponding to the first data exchange unit and a resource corresponding to the first pRRU, to obtain a plurality of sector device group object resources; selecting, by the first BBU, a first sector device group object resource from the plurality of sector device group object resources based on a resource configuration request of the second base station network management subsystem; and notifying, by the first BBU, the second BBU of the first sector device group object resource. The first BBU performs slicing processing on the resource corresponding to the first data exchange unit and the resource corresponding to the first pRRU, to obtain the plurality of sector device group object resources. The first BBU allocates the first sector device group object resource to the second base station network management subsystem based on the resource configuration request of the second base station network management subsystem, so that operator devices can independently invoke common resources such as an RHUB and a pRRU.

In a possible design of this embodiment of this application, the integrated access system further includes a third BBU and a third base station network management subsystem, the first BBU is connected to the third BBU, the third BBU is connected to the third base station network management subsystem, and the method further includes: selecting, by the first BBU, a second sector device group object resource from the plurality of sector device group object resources based on a resource configuration request of the third base station network management subsystem; and notifying, by the first BBU, the third BBU of the second sector device group object resource. If the first BBU is connected to the second BBU and the third BBU through a fiber channel, the first BBU may further allocate the second sector device group object resource to the third base station network management subsystem based on the resource configuration request of the third base station network management subsystem, so that operator devices can independently invoke common resources such as an RHUB and a pRRU.

In a possible design of this embodiment of this application, the resource corresponding to the first data exchange unit includes a radio frequency combination cell capability resource and a transmission channel bandwidth resource, and the resource corresponding to the first pRRU includes a radio frequency resource.

According to a seventh aspect, an embodiment of this application further provides a configuration method based on an integrated access system. The integrated access system includes a first baseband unit BBU, a second BBU, a first data exchange unit, a second base station network management subsystem, and a first pico remote radio unit pRRU. The first BBU is separately connected to the second BBU and the first data exchange unit, the first data exchange unit is connected to the first pRRU, and the second BBU is connected to the second base station network management subsystem. The method includes: obtaining, by the second BBU, a first sector device group object resource notified by the first BBU; and binding, by the second BBU, the first sector device group object resource to a baseband resource of the second BBU, and activating a physical cell corresponding to the first sector device group object resource. The second BBU obtains the first sector device group object resource notified by the first BBU, and the second BBU binds the first sector device group object resource to the baseband resource of the second BBU, and activates the physical cell corresponding to the first sector device group object resource, so that operator devices can independently invoke common resources such as an RHUB and a pRRU.

According to an eighth aspect, an embodiment of this application further provides a BBU. The BBU is specifically a first BBU, and the first BBU belongs to an integrated access system. The integrated access system further includes a second BBU, and the first BBU is connected to the second BBU. The first BBU includes: an obtaining module, configured to obtain first clock synchronization information, where the first clock synchronization information includes a clock frequency and a clock phase of the first BBU; and a sending module, configured to send the first clock synchronization information to the second BBU. The first BBU may send the first clock synchronization information to the second BBU, so that the second BBU can configure local clock information of the second BBU based on the first clock synchronization information, thereby implementing inter-subrack clock synchronization between BBUs. For example, a BBU mode is configured. Through an OM channel of a base station network management subsystem, the first BBU may be configured as a host BBU mode, and the second BBU may be configured as a client BBU mode. Inter-subrack convergence of a plurality of BBUs is supported, so that a plurality of operators access different BBUs, thereby resolving a problem of operation and maintenance decoupling between the operators, and implementing future large-capacity evolution based on BBU access. In addition, inter-subrack connection between a plurality of host BBUs and a plurality of client BBUs is supported in this embodiment of this application, so that one central equipment room covers a plurality of surrounding buildings.

In the eighth aspect of this application, composition modules of the first BBU may further perform the steps described in the second aspect and the possible implementations. For details, refer to the descriptions in the second aspect and the possible implementations.

According to a ninth aspect, an embodiment of this application further provides a BBU. The BBU is specifically a second BBU, and the second BBU belongs to an integrated access system. The integrated access system further includes a first BBU, and the first BBU is connected to the second BBU. The second BBU includes: a receiving module, configured to receive first clock synchronization information sent by the first BBU, where the first clock synchronization information includes a clock frequency and a clock phase of the first BBU; and a configuration module, configured to configure local clock information of the second BBU based on the first clock synchronization information. The first BBU may send the first clock synchronization information to the second BBU, so that the second BBU can configure the local clock information of the second BBU based on the first clock synchronization information, thereby implementing inter-subrack clock synchronization between BBUs.

In the ninth aspect of this application, composition modules of the second BBU may further perform the steps described in the third aspect and the possible implementations. For details, refer to the descriptions in the third aspect and the possible implementations.

According to a tenth aspect, an embodiment of this application further provides a BBU. The BBU is specifically a first BBU, and the first BBU belongs to an integrated access system. The integrated access system further includes a second BBU, and the first BBU is connected to the second BBU. The first BBU includes: a line rate update module, configured to: update a first line rate, and send a data frame to the second BBU at an updated first line rate after each update; a receiving module, configured to receive a data frame that is sent by the second BBU at an updated second line rate after each time the second BBU updates a second line rate; a sending module, configured to: when the first line rate is equal to the second line rate, send networking relationship information of the first BBU to the second BBU at the first line rate, and receive networking relationship information of the second BBU that is sent by the second BBU at the second line rate; an address allocation module, configured to: allocate a communication address to the second BBU based on the networking relationship information of the second BBU, and send a communication address of the first BBU to the second BBU; and a channel establishment module, configured to establish a bidirectional upper-layer communication channel with the second BBU based on the communication address of the second BBU. The first BBU and the second BBU may perform line rate auto-negotiation. The first BBU allocates the communication address to the second BBU, and the second BBU may obtain the communication address of the first BBU. The first BBU establishes the bidirectional upper-layer communication channel with the second BBU based on the communication address of the second BBU. Through line rate auto-negotiation, networking relationship information exchange, and communication address allocation, the upper-layer communication channel may be automatically established between the first BBU and the second BBU without manual configuration, thereby reducing manual costs and decreasing an error probability. For example, an upper-layer communication channel is automatically established between a host BBU and a client BBU, thereby reducing a configuration workload of service personnel and complexity of site setup.

In the tenth aspect of this application, composition modules of the first BBU may further perform the steps described in the fourth aspect and the possible implementations. For details, refer to the descriptions in the fourth aspect and the possible implementations.

According to an eleventh aspect, an embodiment of this application further provides a BBU. The BBU is specifically a second BBU, and the second BBU belongs to an integrated access system. The integrated access system further includes a first BBU, and the first BBU is connected to the second BBU. The second BBU includes: a line rate update module, configured to: update a second line rate, and send a data frame to the first BBU at an updated second line rate after each update; a receiving module, configured to receive a data frame that is sent by the first BBU at an updated first line rate after each time the first BBU updates a first line rate; a sending module, configured to: when the second line rate is equal to the first line rate, send, by the second BBU, networking relationship information of the second BBU to the first BBU at the second line rate, and receive networking relationship information of the first BBU that is sent by the first BBU at the first line rate; an address obtaining module, configured to obtain a communication address of the first BBU; and a channel establishment module, configured to establish a bidirectional upper-layer communication channel with the first BBU based on the communication address of the first BBU. The first BBU and the second BBU may perform line rate auto-negotiation. The first BBU allocates a communication address to the second BBU, and the second BBU may obtain the communication address of the first BBU. The first BBU establishes the bidirectional upper-layer communication channel with the second BBU based on the communication address of the second BBU. Through line rate auto-negotiation, networking relationship information exchange, and communication address allocation, the upper-layer communication channel may be automatically established between the first BBU and the second BBU without manual configuration, thereby reducing manual costs and decreasing an error probability.

In the eleventh aspect of this application, composition modules of the second BBU may further perform the steps described in the fifth aspect and the possible implementations. For details, refer to the descriptions in the fifth aspect and the possible implementations.

According to a twelfth aspect, an embodiment of this application further provides a BBU. The BBU is specifically a first BBU, and the first BBU belongs to an integrated access system. The integrated access system further includes a second BBU, a first data exchange unit, a second base station network management subsystem, and a first pico remote radio unit pRRU. The first BBU is separately connected to the second BBU and the first data exchange unit, the first data exchange unit is connected to the first pRRU, and the second BBU is connected to the second base station network management subsystem. The first BBU includes: a slicing module, configured to perform slicing processing on a resource corresponding to the first data exchange unit and a resource corresponding to the first pRRU, to obtain a plurality of sector device group object resources; a resource allocation module, configured to select a first sector device group object resource from the plurality of sector device group object resources based on a resource configuration request of the second base station network management subsystem; and a notification module, configured to notify the second BBU of the first sector device group object resource. The first BBU performs slicing processing on the resource corresponding to the first data exchange unit and the resource corresponding to the first pRRU, to obtain the plurality of sector device group object resources. The first BBU allocates the first sector device group object resource to the second base station network management subsystem based on the resource configuration request of the second base station network management subsystem, so that operator devices can independently invoke common resources such as an RHUB and a pRRU.

In the twelfth aspect of this application, composition modules of the first BBU may further perform the steps described in the sixth aspect and the possible implementations. For details, refer to the descriptions in the sixth aspect and the possible implementations.

According to a thirteenth aspect, an embodiment of this application further provides a BBU. The BBU is specifically a second BBU, and the second BBU belongs to an integrated access system. The integrated access system further includes a first BBU, a second BBU, a first data exchange unit, a second base station network management subsystem, and a first pico remote radio unit pRRU. The first BBU is separately connected to the second BBU and the first data exchange unit, the first data exchange unit is connected to the first pRRU, and the second BBU is connected to the second base station network management subsystem. The second BBU includes: a resource obtaining unit, configured to obtain a first sector device group object resource notified by the first BBU; a resource use module, configured to: bind the first sector device group object resource to a baseband resource of the second BBU, and activate a physical cell corresponding to the first sector device group object resource. The second BBU obtains the first sector device group object resource notified by the first BBU, and the second BBU binds the first sector device group object resource to the baseband resource of the second BBU, and activates the physical cell corresponding to the first sector device group object resource, so that operator devices can independently invoke common resources such as an RHUB and a pRRU.

In the thirteenth aspect of this application, composition modules of the second BBU may further perform the steps described in the seventh aspect and the possible implementations. For details, refer to the descriptions in the seventh aspect and the possible implementations.

According to a fourteenth aspect of this application, a computer-readable storage medium is provided. The computer-readable storage medium stores an instruction, and when the instruction is run on a computer, the computer is enabled to perform the method according to each of the foregoing aspects.

According to a fifteenth aspect of this application, a computer program product including an instruction is provided. When the instruction is run on a computer, the computer is enabled to perform the method according to each of the foregoing aspects.

BRIEF DESCRIPTION OF DRAWINGS

FIG. 17 is a schematic structural diagram of composition of a second BBU according to an embodiment of this application;

FIG. 18-a is a schematic structural diagram of composition of another first BBU according to an embodiment of this application;

FIG. 18-b is a schematic structural diagram of composition of another first BBU according to an embodiment of this application;

FIG. 19-a is a schematic structural diagram of composition of another second BBU according to an embodiment of this application;

FIG. 19-b is a schematic structural diagram of composition of another second BBU according to an embodiment of this application;

FIG. 20 is a schematic structural diagram of composition of another first BBU according to an embodiment of this application;

DESCRIPTION OF EMBODIMENTS

Embodiments of this application provide an integrated access system and a configuration method based on the integrated access system, to implement internal decoupling of the integrated access system, and improve reliability and maintainability of the integrated access system.

The following describes the embodiments of this application with reference to the accompanying drawings.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of this application. In addition, the terms "include", "have" and any other variants thereof are intended to cover a non-exclusive inclusion, so that a process, method, system, product, or device that includes a series of units is not necessarily limited to those units, but may include other units not expressly listed or inherent to such a process, method, product, or device.

Detailed descriptions are separately provided below.

Figure 1:
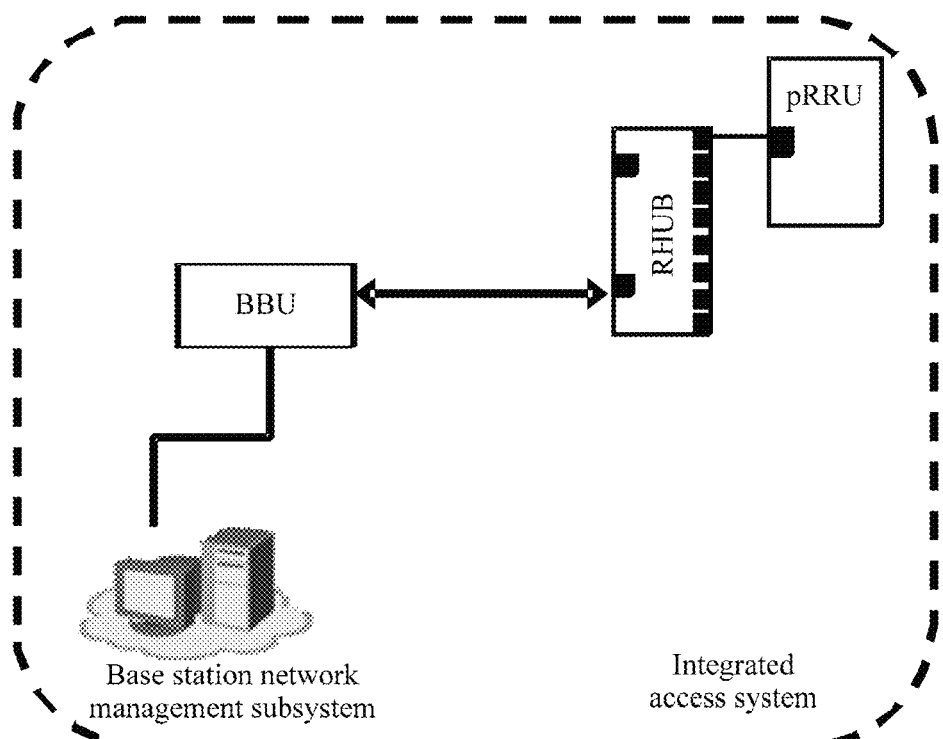
FIG. 1 is a schematic diagram of a networking architecture of LampSite in the prior art.
Figure 2:
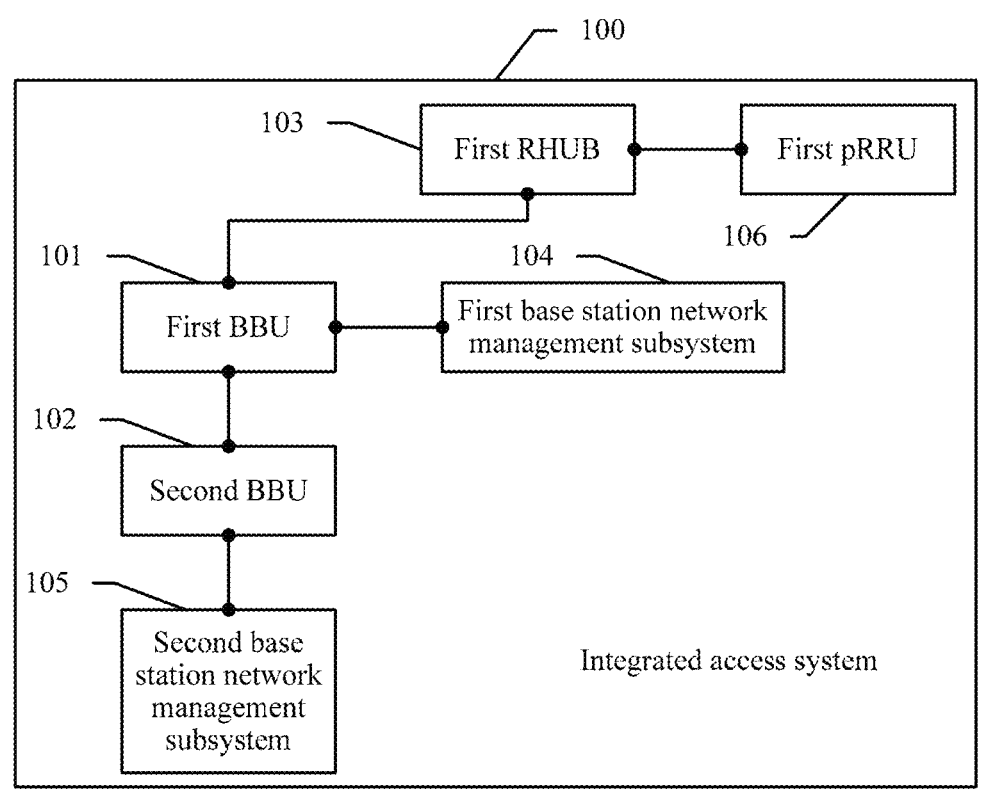
FIG. 2 is a schematic structural diagram of composition of an integrated access system according to an embodiment of this application.

The integrated access system provided in the embodiments of this application is applicable to a scenario in which a single operator and a plurality of operators perform operation and maintenance together. The integrated access system may support independent feeding of radio frequency (RF) signal sources by operators, and support feeding of digital signal sources in future large-capacity and 5th generation mobile communications technology (5G) scenarios. A distributed BBU is used in the integrated access system provided in the embodiments of this application, and at least two types of BBUs are used: a first BBU and a second BBU. Therefore, each BBU may be connected to a network management subsystem of the BBU, thereby implementing decoupling inside the integrated access system. Referring to FIG. 2, an integrated access system 100 provided in an embodiment of this application may include a first BBU 101, a second BBU 102, a first data exchange unit 103, a first base station network management subsystem 104, a second base station network management subsystem 105, and a first pRRU 106.

The first BBU 101 is connected to the first data exchange unit 103, the first BBU 101 is connected to the first base station network management subsystem 104, and the first BBU 101 is connected to the second BBU 102.

The second BBU 102 is connected to the second base station network management subsystem 105.

The first pRRU 106 is connected to the first data exchange unit 103.

In the integrated access system provided in this embodiment of this application, at least two types of BBUs are used: the first BBU 101 and the second BBU 102. The first BBU 101 and the second BBU 102 may be connected to each other through a fiber channel. For example, the fiber channel may specifically include a CPRI channel and a media access control (MAC) channel. The first BBU 101 may be connected to the first base station network management subsystem 104 through an operation management (OM) channel. The first base station network management subsystem 104 is a network management subsystem used to manage the first BBU. The first base station network management subsystem may provide a radio frequency feeding function, a function of slicing a resource corresponding to the first data exchange unit and a resource corresponding to the first pRRU, and a function of an inter-subrack connection between the first BBU and the second BBU. The second BBU 102 is connected to the second base station network management subsystem 105 through an OM channel, and an operator may configure and manage a baseband resource by using the second base station network management subsystem 105.

In this embodiment of this application, the first BBU 101 serves as a host BBU and may be disposed in a building, and the second BBU 102 serves as a client BBU and may be disposed in a central equipment room. Therefore, a distributed design of the host BBU and the client BBU may be implemented. The first BBU 101 is connected to the first base station network management subsystem 104, and a radio frequency resource may be configured and managed by using the first base station network management subsystem 104. The second BBU 102 is connected to the second base station network management subsystem 105, so that the second base station network management subsystem 105 may configure a baseband resource according to a requirement of an operator. Through the distributed design of the host BBU and the client BBU, decoupling inside the integrated access system may be implemented, and operation and maintenance of an operator can be completed by using only the base station network management subsystem, thereby improving reliability and maintainability of the integrated access system.

In some embodiments of this application, for composition structures that need to be used by the first BBU and the second BBU according to their respective requirements, the first BBU may include a radio frequency board, an interface board, a main control board, and a direct current (DC); and the second BBU may include a baseband board, a main control board, and a DC. The interface board of the first BBU may be separately connected to the first data exchange unit, the baseband board of the second BBU. The main control board of the first BBU may be connected to the first base station network management subsystem. The main control board of the second BBU may be connected to the second base station network management subsystem. In some other embodiments of this application, in addition to the baseband board, the main control board, the DC, the second BBU may include an interface board. In this case, the interface board of the first BBU may be connected to the interface board of the second BBU.

It should be noted that in some embodiments of this application, the first BBU 101 and the first data exchange unit 103 may be connected to each other through a fiber channel. The fiber channel may specifically include a CPRI channel and a MAC channel. The first data exchange unit 103 may be specifically a remote CPRI data exchange unit, which may also be referred to as an "RHUB" in a subsequent embodiment. The RHUB may implement communication between the first BBU 101 and the first pRRU 106, and the first pRRU 106 implements a radio frequency signal processing function.

Figure 3:
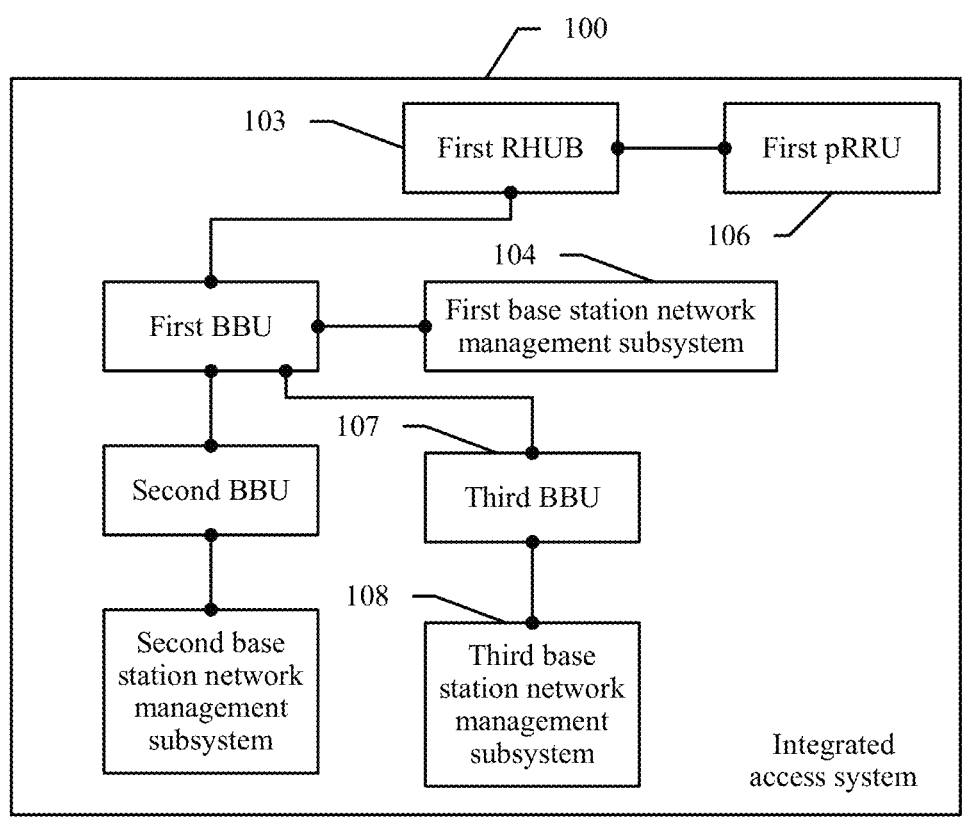
FIG. 3 is a schematic structural diagram of composition of another integrated access system according to an embodiment of this application.

In some embodiments of this application, referring to FIG. 3, the integrated access system 100 further includes a third BBU 107 and a third base station network management subsystem 108.

The first BBU 101 is connected to the third BBU 107.

The third BBU 107 is connected to the third base station network management subsystem 108.

The first BBU 101 and the third BBU 107 may be connected to each other through a fiber channel. For example, the fiber channel may specifically include a CPRI channel and a MAC channel. The third BBU 107 may be connected to the third base station network management subsystem 108 through an OM channel, and an operator may configure and manage a baseband resource by using the third base station network management subsystem 108.

In the foregoing embodiment of this application, in the integrated access system 100, the first BBU 101 is disposed as a host BBU, and both the second BBU 102 and the third BBU 107 are disposed as client BBUs. In addition, the second BBU 102 and the third BBU 107 are connected to respective base station network management subsystems. For example, the second BBU 102 is connected to the second base station network management subsystem 105, and the third BBU 107 is connected to the third base station network management subsystem 108. Therefore, in a scenario in which a plurality of operators establish a network together and share a network resource after establishment, the different operators may separately use the second base station network management subsystem and the third base station network management subsystem, thereby implementing asset decoupling, operation and maintenance decoupling, and service activation and upgrade decoupling between the plurality of operators. Client BBUs included in the integrated access system 100 may be not limited to the second BBU and the third BBU. When a plurality of client BBUs are connected to the first BBU (namely, the host BBU) in the integrated access system through a fiber channel, each client BBU may be connected to one base station network management subsystem. Each of the different operators may use one base station network management subsystem, and the operators are decoupled, so that the operators do not interfere with each other.

Figure 5:
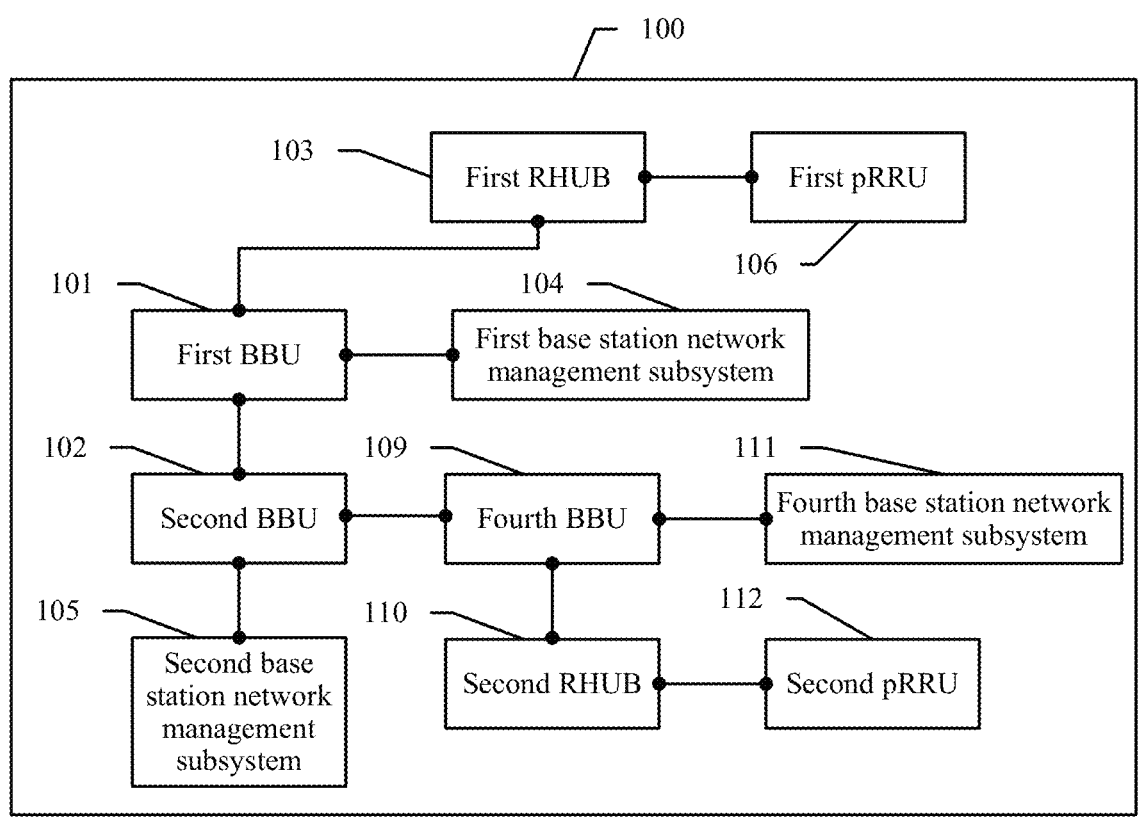
FIG. 5 is a schematic structural diagram of composition of another integrated access system according to an embodiment of this application.
Figure 6A:
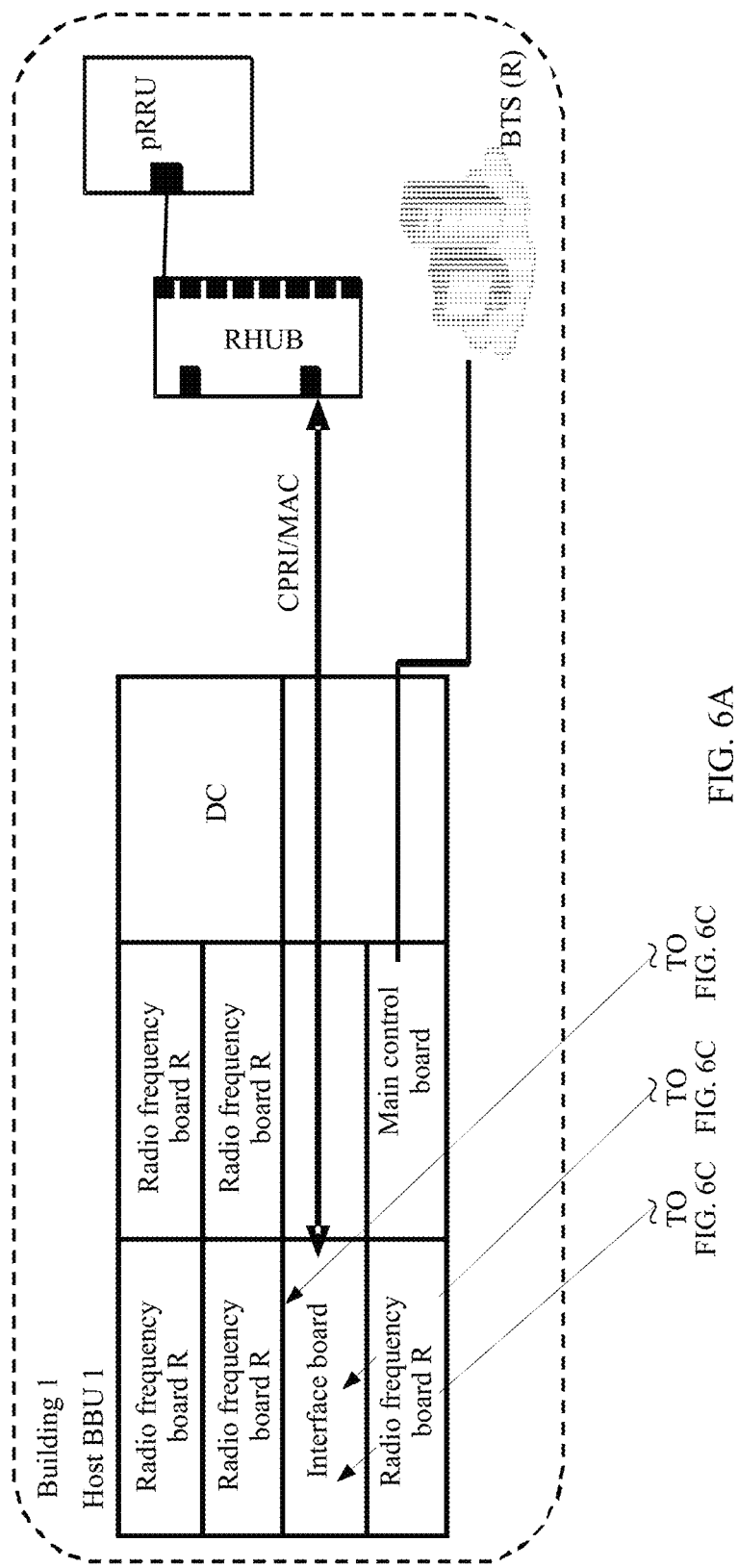
FIG. 6A, FIG. 6B, FIG. 6C, and FIG. 6D are a schematic diagram of system architecture deployment of another integrated access system according to an embodiment of this application.
Figure 6B:
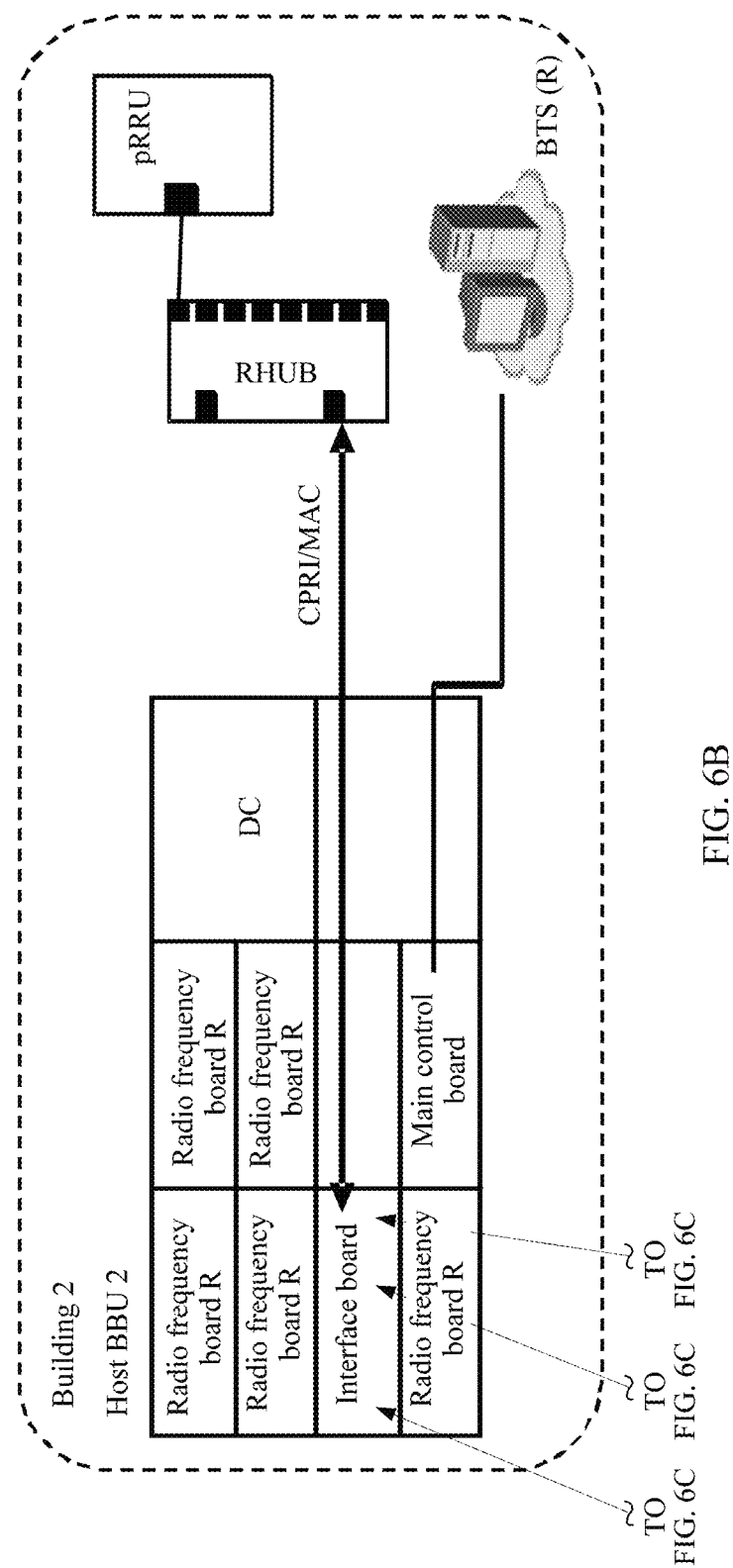
Figure 6C:
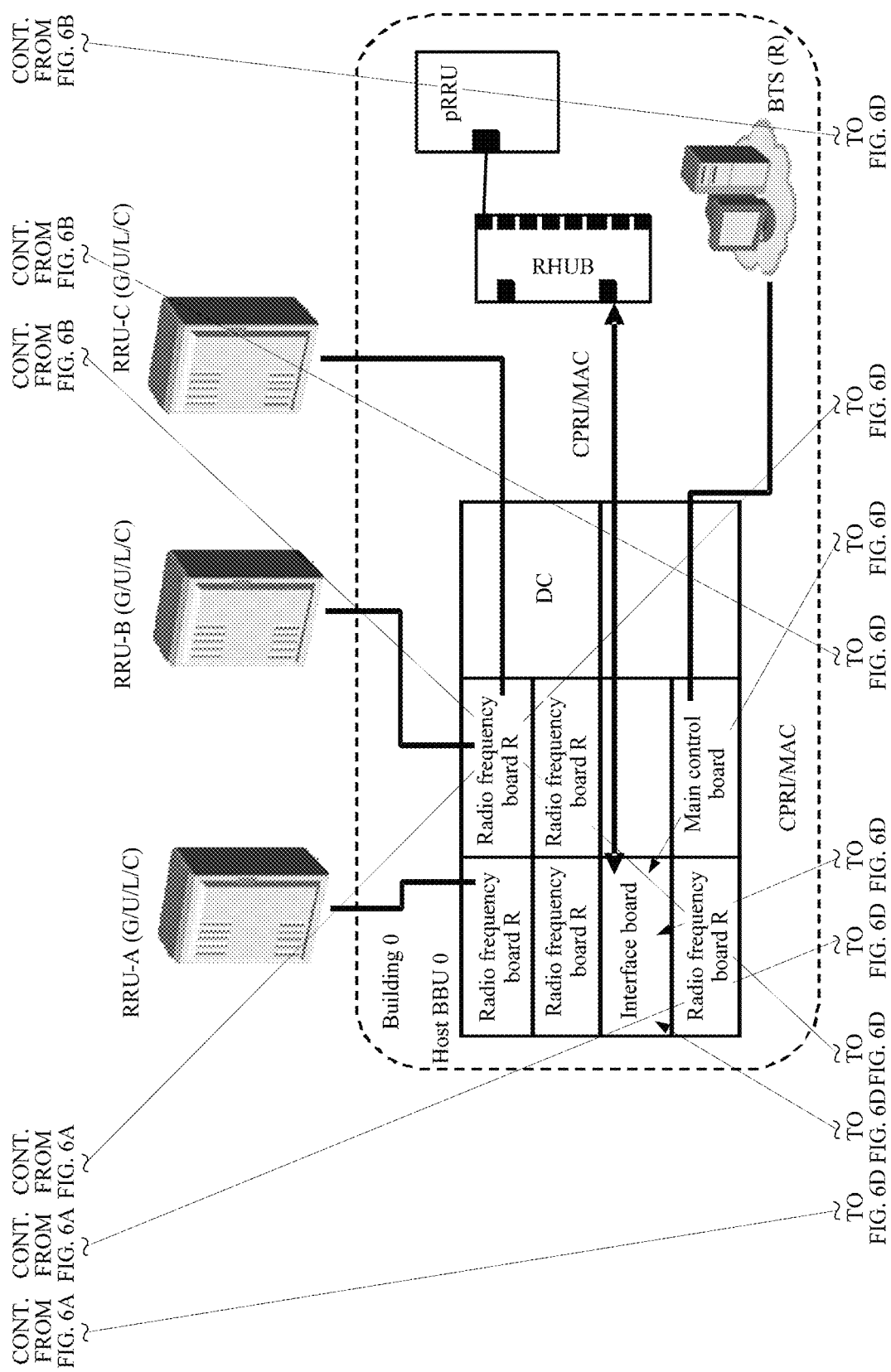
Figure 6D:
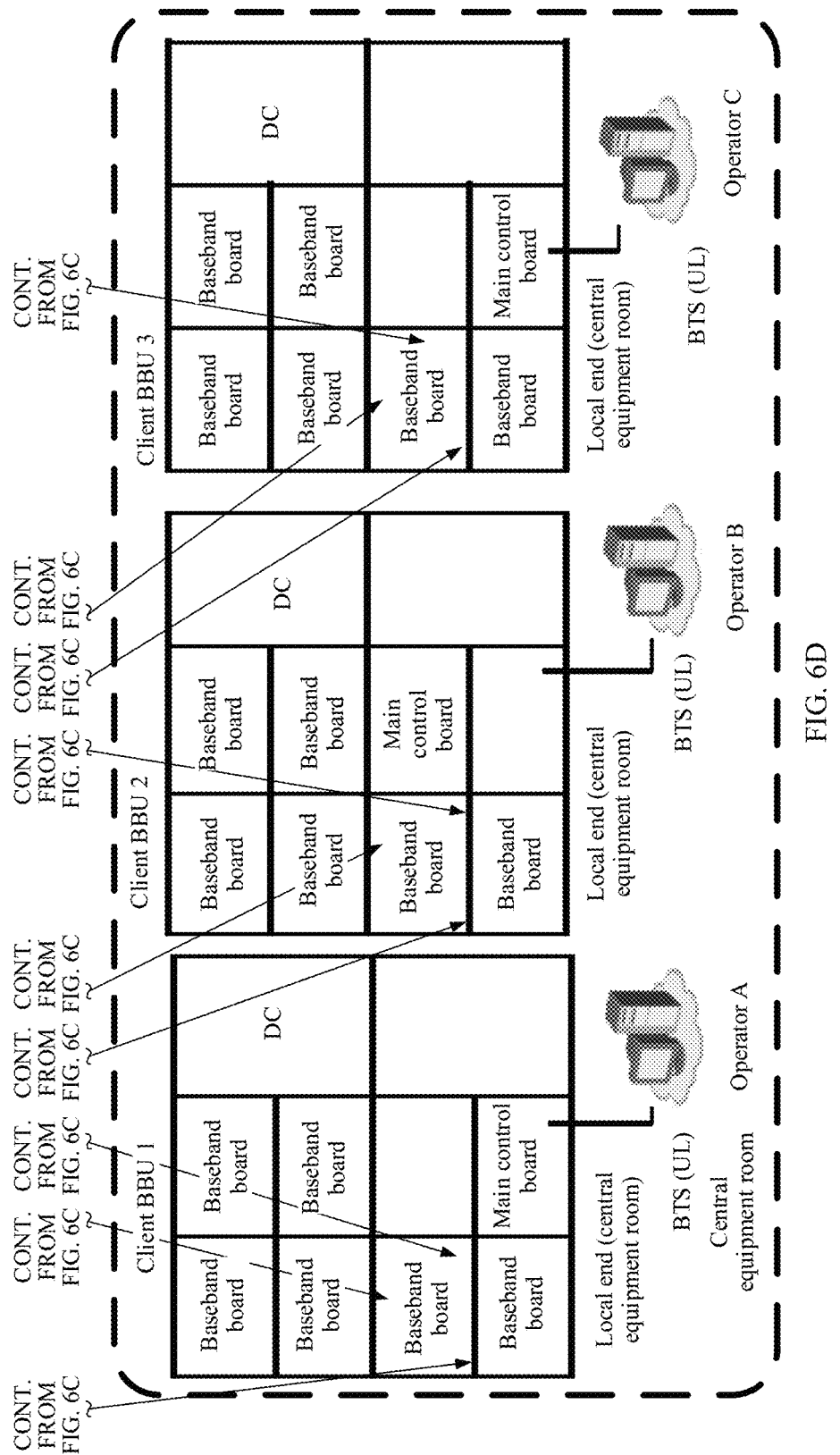

FIG. 5 is a schematic diagram of system architecture deployment of an integrated access system according to an embodiment of this application. One host BBU and three client BBUs (a client BBU 1, a client BBU 2, and a client BBU 3) are disposed in the integrated access system. The host BBU is disposed in a building at a remote end, and the three client BBUs are disposed in a central equipment room at a local end. The host BBU includes a radio frequency board R, an interface board, a main control board, and a DC. The interface board of the host BBU is separately connected to baseband boards of the three client BBUs, and the interface board of the host BBU is further connected to an RHUB through a CPRI channel and a MAC channel. The RHUB is connected to a pRRU through an electrical interface (which is also referred to as a CPRI-E interface) of the CPRI channel or through an electrical interface of the MAC channel. The main control board of the host BBU is connected to an indoor distributed unified network management subsystem (which is abbreviated to a BTS (R) in FIG. 5). The radio frequency board R of the host BBU is connected to a remote radio unit (RRU). For example, three RRUs are further disposed in the integrated access system in FIG. 5. The three RRUs are respectively an RRU-A, an RRU-B, and an RRU-C. Each RRU supports a global system for mobile communications (GSM), a universal mobile telecommunications system (UMTS), long term evolution (LTE), and code division multiple access (CDMA), that is, "G/U/L/C" shown in FIG. 5. Each client BBU includes a baseband board and a main control board. The baseband board of the client BBU is connected to the interface board of the host BBU. The main control board of the client BBU is connected to a baseband network management subsystem (which is abbreviated to a BTS (UL) in FIG. 5). For example, the main control board of the client BBU 1 is connected to a base station network management subsystem through an OM channel, and an operator A may configure and manage a baseband resource by using the base station network management subsystem. The client BBU 2 is connected to a base station network management subsystem through an OM channel, and an operator B may configure and manage a baseband resource by using the base station network management subsystem. The client BBU 3 is connected to a base station network management subsystem through an OM channel, and an operator C may configure and manage a baseband resource by using the base station network management subsystem. In this embodiment of this application, a plurality of client BBUs can be converged at a host BBU, so that a plurality of operators access different BBUs. This resolves a problem of operation and maintenance decoupling between the operators, and is applicable to future large-capacity evolution and 5G evolution scenarios.

In some embodiments of this application, referring to FIG. 5, the integrated access system further includes a fourth BBU 109, a second data exchange unit 110, a fourth base station network management subsystem 111, and a second pRRU 112.

The fourth BBU 109 is connected to the second data exchange unit 110, the fourth BBU 109 is connected to the fourth base station network management subsystem 111, and the fourth BBU 109 is connected to the second BBU 102.

The second pRRU 112 is connected to the second data exchange unit 110.

In the integrated access system, both the first BBU 101 and the fourth BBU 109 may serve as host BBUs. For example, the first BBU 101 and the fourth BBU 109 may be disposed in different buildings. The first BBU 101 and the fourth BBU 109 may be separately connected to the second BBU 102 through different fiber channels. The second BBU 102 may be disposed in a central equipment room, to support an inter-subrack connection between a client BBU and a plurality of host BBUs, so that one central equipment room covers a plurality of surrounding buildings.

It should be noted that in the foregoing embodiment of this application, if a plurality of operators need to access the integrated access system, each operator can use one client BBU and one base station network management subsystem. When there are a plurality of host BBUs, each host BBU can be connected to all client BBUs. For a connection manner, refer to a manner in which the first BBU 101 and the fourth BBU 109 are separately connected to the second BBU 102.

FIG. 6A, FIG. 6B, FIG. 6C, and FIG. 6D are a schematic diagram of system architecture deployment of another integrated access system according to an embodiment of this application. Three host BBUs and three client BBUs (a client BBU 1, a client BBU 2, and a client BBU 3) are disposed in the integrated access system. A host BBU 0 is disposed in a building 0 at a remote end, a host BBU 1 is disposed in a building 1 at a remote end, and a host BBU 2 is disposed in a building 2 at a remote end. The three client BBUs are disposed in a central equipment room at a local end. The host BBU disposed in the building 0 is used as an example. The host BBU includes a radio frequency board R, an interface board, a main control board, and a DC. The interface board of the host BBU is separately connected to baseband boards of the three client BBUs, and the interface board of the host BBU is further connected to an RHUB through a CPRI channel and a MAC channel. The RHUB is connected to a pRRU through a CPRI-E interface or an electrical interface of the MAC channel. The main control board of the host BBU is connected to an indoor distributed unified network management subsystem (which is abbreviated to a BTS (R) in FIG. 5). The radio frequency board R of the host BBU is connected to an RRU. For example, three RRUs are further disposed in the integrated access system in FIG. 6. The three RRUs are respectively an RRU-A, an RRU-B, and an RRU-C. As shown in FIG. 6, a plurality of host BBUs or a plurality of client BBUs may be disposed in the integrated access system. Therefore, an inter-subrack connection between a client BBU and a plurality of host BBUs may be supported, so that one central equipment room covers a plurality of surrounding buildings.

It can be learned from the description of the composition structure of the integrated access system provided in the embodiments of this application that the integrated access system includes two types of BBUs: the first BBU and the second BBU. The first BBU and the second BBU are connected to communicate with each other. In addition, the first BBU is connected to the first base station network management subsystem, and the second BBU is connected to the second base station network management subsystem. Therefore, a radio frequency resource of the first BBU may be separately configured and managed by using the first base station network management subsystem, and a baseband resource of the second BBU may be separately configured and managed by using the second base station network management subsystem. In this way, a radio frequency resource and a baseband resource can be independently managed, and reliability and maintainability of the integrated access system are greatly improved.

Figure 7:
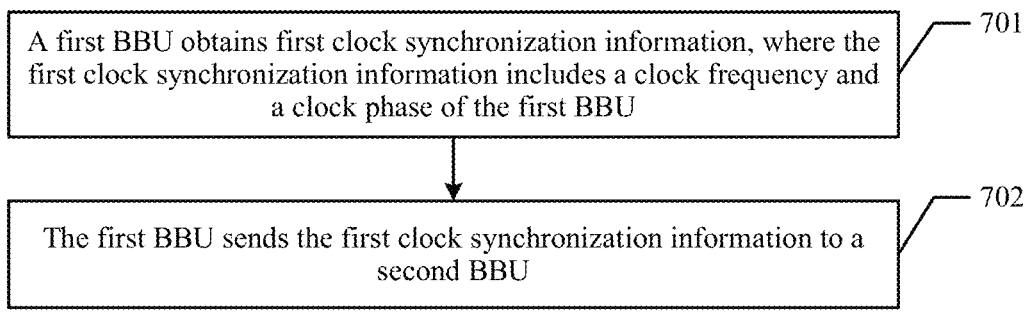
FIG. 7 is a schematic block flowchart of a configuration method based on an integrated access system according to an embodiment of this application.

The integrated access system provided in the embodiments of this application is described in the foregoing embodiments. A configuration method based on the integrated access system is described below. The method may be used to implement clock configuration in the integrated access system. A configuration method provided in an embodiment of this application is applicable to an integrated access system. As shown in FIG. 2, the integrated access system includes a first BBU and a second BBU. The first BBU is connected to the second BBU. For example, the first BBU and the second BBU are connected to each other through a fiber channel. As shown in FIG. 7, the configuration method provided in this embodiment of this application may include the following steps:

701. The first BBU obtains first clock synchronization information, where the first clock synchronization information includes a clock frequency and a clock phase of the first BBU.

702. The first BBU sends the first clock synchronization information to the second BBU.

The first BBU serves as a host BBU, and the first BBU needs to provide a reference clock to the second BBU. The second BBU may correct a local clock of the second BBU based on the reference clock provided by the first BBU, thereby implementing inter-subrack clock synchronization between BBUs. The first BBU may obtain the clock frequency and the clock phase of the first BBU from a local clock source, and then the first BBU sends the first clock synchronization information to the second BBU. In addition, the first BBU may interact with a clock server, and obtain the clock frequency and the clock phase from the clock server. Then the first BBU corrects the local clock source of the first BBU based on the clock frequency and the clock phase, for example, may perform feedback control by using a phase-locked loop (PLL), and control a frequency and a phase of a clock signal in the loop by using an external reference signal provided by the clock server. The first BBU and the second BBU may be connected to each other through a fiber channel, and the fiber channel may specifically include a CPRI channel and a MAC channel. The first BBU may add the first clock synchronization information to a CPRI frame, and then send the CPRI frame to the second BBU through the CPRI channel. Alternatively, the first BBU may add the first clock synchronization information to a MAC channel, and then send the MAC frame to the second BBU through the MAC channel.

In some embodiments of this application, with reference to FIG. 3, the integrated access system further includes a third BBU, and the third BBU is connected to the first BBU. In this implementation scenario, the configuration method based on the integrated access system may further include the following step:

A1. The first BBU sends the first clock synchronization information to the third BBU.

When the first BBU is connected to two client BBUs as a host BBU, after the first BBU obtains the first clock synchronization information, the first BBU may separately send the first clock synchronization information to the second BBU and the third BBU, so that the third BBU, as a client BBU, can also receive the first clock synchronization information of the first BBU. The third BBU may use the first clock synchronization information to correct a local clock source of the third BBU, thereby implementing inter-subrack clock synchronization between BBUs.

It should be noted that in the foregoing embodiment of this application, a clock synchronization process is described from a first BBU side. It may be understood that a method performed by the fourth BBU is similar to the method performed by the first BBU. The fourth BBU may generate second clock synchronization information, and then the fourth BBU sends the second clock synchronization information to the second BBU. The second clock synchronization information includes a clock frequency and a clock phase of the fourth BBU.

It can be learned from the example description of a clock configuration process shown in FIG. 7 that the first BBU may send the first clock synchronization information to the second BBU, so that the second BBU can configure local clock information of the second BBU based on the first clock synchronization information, thereby implementing inter-subrack clock synchronization between BBUs. For example, a BBU mode is configured. Through an OM channel of a base station network management subsystem, the first BBU may be configured as a host BBU mode, and the second BBU may be configured as a client BBU mode. Inter-subrack convergence of a plurality of BBUs is supported, so that a plurality of operators access different BBUs, thereby resolving a problem of operation and maintenance decoupling between the operators, and implementing future large-capacity evolution based on BBU access. In addition, inter-subrack connection between a plurality of host BBUs and a plurality of client BBUs is supported in this embodiment of this application, so that one central equipment room covers a plurality of surrounding buildings.

Figure 8:
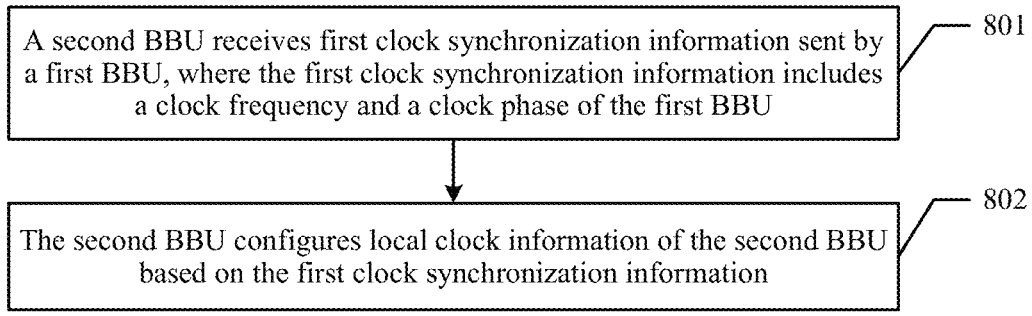
FIG. 8 is a schematic block flowchart of another configuration method based on an integrated access system according to an embodiment of this application.

The configuration method based on the integrated access system is described from a first BBU side in the foregoing embodiment, and the configuration method based on the integrated access system provided in the embodiments of this application is described below from a second BBU side. The method may be used to implement clock configuration in the integrated access system. A configuration method provided in an embodiment of this application is applicable to an integrated access system. As shown in FIG. 2, the integrated access system includes a first BBU and a second BBU. The first BBU is connected to the second BBU. For example, the first BBU and the second BBU are connected to each other through a fiber channel. As shown in FIG. 8, the configuration method provided in this embodiment of this application may include the following steps.

801. The second BBU receives first clock synchronization information sent by the first BBU, where the first clock synchronization information includes a clock frequency and a clock phase of the first BBU.

The second BBU and the first BBU are connected to each other through a fiber channel. The first BBU sends the first clock synchronization information to the second BBU. The second BBU may receive the first clock synchronization information through the fiber channel, and the second BBU may parse the first clock synchronization information to obtain the clock frequency and the clock phase of the first BBU.

802. The second BBU configures local clock information of the second BBU based on the first clock synchronization information.

After the second BBU obtains the first clock synchronization information from the first BBU, the second BBU corrects the local clock information of the second BBU by using the clock frequency and the clock phase of the first BBU as a reference clock source. For example, the second BBU may perform feedback control by using a PLL, and control a frequency and a phase of a clock signal in the loop by using an external reference signal provided by the first BBU.

In some embodiments of this application, the integrated access system further includes a fourth BBU, and the fourth BBU is connected to the second BBU. A method performed by the fourth BBU is described in the foregoing embodiment of this application. The fourth BBU may generate second clock synchronization information, and then the fourth BBU sends the second clock synchronization information to the second BBU. The second clock synchronization information includes a clock frequency and a clock phase of the fourth BBU. In this scenario, in addition to the foregoing steps, the configuration method provided in this embodiment of this application includes the following step:

B1. The second BBU receives the second clock synchronization information sent by the fourth BBU, where the second clock synchronization information includes the clock frequency and the clock phase of the fourth BBU.

In addition to receiving the first clock synchronization information, the second BBU receives the second clock synchronization information of the fourth BBU. The second BBU may parse the second clock synchronization information to obtain the clock frequency and the clock phase of the fourth BBU. When both the second BBU and the fourth BBU serve as host BBUs, the second BBU and the fourth BBU may separately send the clock synchronization information to the second BBU serving as a client BBU, and the second BBU may separately obtain the clock frequency and the clock phase of the first BBU, and the clock frequency and the clock phase of the fourth BBU.

In the implementation scenario in which step B1 is performed, step 802 in which the second BBU configures the local clock information of the second BBU based on the first clock synchronization information includes the following step:

C1. The second BBU configures the local clock information of the second BBU based on the first clock synchronization information and the second clock synchronization information.

When the second BBU separately obtains the first clock synchronization information and the second clock synchronization information, the second BBU may obtain the clock frequency and the clock phase of the first BBU, and the clock frequency and the clock phase of the fourth BBU. The second BBU determines the local clock information of the second BBU by using the clock synchronization information of the two host BBUs. The second BBU may configure the local clock information in a plurality of manner. For example, step C1 in which the second BBU configures the local clock information of the second BBU based on the first clock synchronization information and the second clock synchronization information includes the following step:

C11. The second BBU selects clock synchronization information with higher clock quality from the first clock synchronization information and the second clock synchronization information, and configures the local clock information of the second BBU based on the clock synchronization information with higher clock quality.

The second BBU may select the clock synchronization information with higher clock quality from the clock synchronization information separately sent by the first BBU and the fourth BBU to the second BBU, and configure the local clock information of the second BBU based on the clock synchronization information with higher clock quality. Clock quality is clock signal quality of a clock source. The clock quality may be measured by stability of the clock source, measured by accuracy of the clock source, or measured by stability and accuracy of the clock source. The clock source has two important indicators: stability and accuracy. Accuracy refers to a deviation from a nominal value, and stability refers to a change amount generated as an external factor changes. For example, higher stability and accuracy indicate higher clock quality of the clock source. In some embodiments of this application, when the second BBU configures the local clock information of the second BBU based on the first clock synchronization information and the second clock synchronization information, the foregoing example description is not intended for limitation, the second BBU may select clock synchronization information with higher stability from the first clock synchronization information and the second clock synchronization information, and configure the local clock information of the second BBU based on the clock synchronization information with higher stability. The clock synchronization information with higher stability is selected as the local clock information of the second BBU, so that clock stability of the second BBU may be ensured.

It can be learned from the example description of a clock configuration process shown in FIG. 8 that the first BBU may send the first clock synchronization information to the second BBU, so that the second BBU can configure the local clock information of the second BBU based on the first clock synchronization information, thereby implementing inter-subrack clock synchronization between BBUs.

Figure 4A:
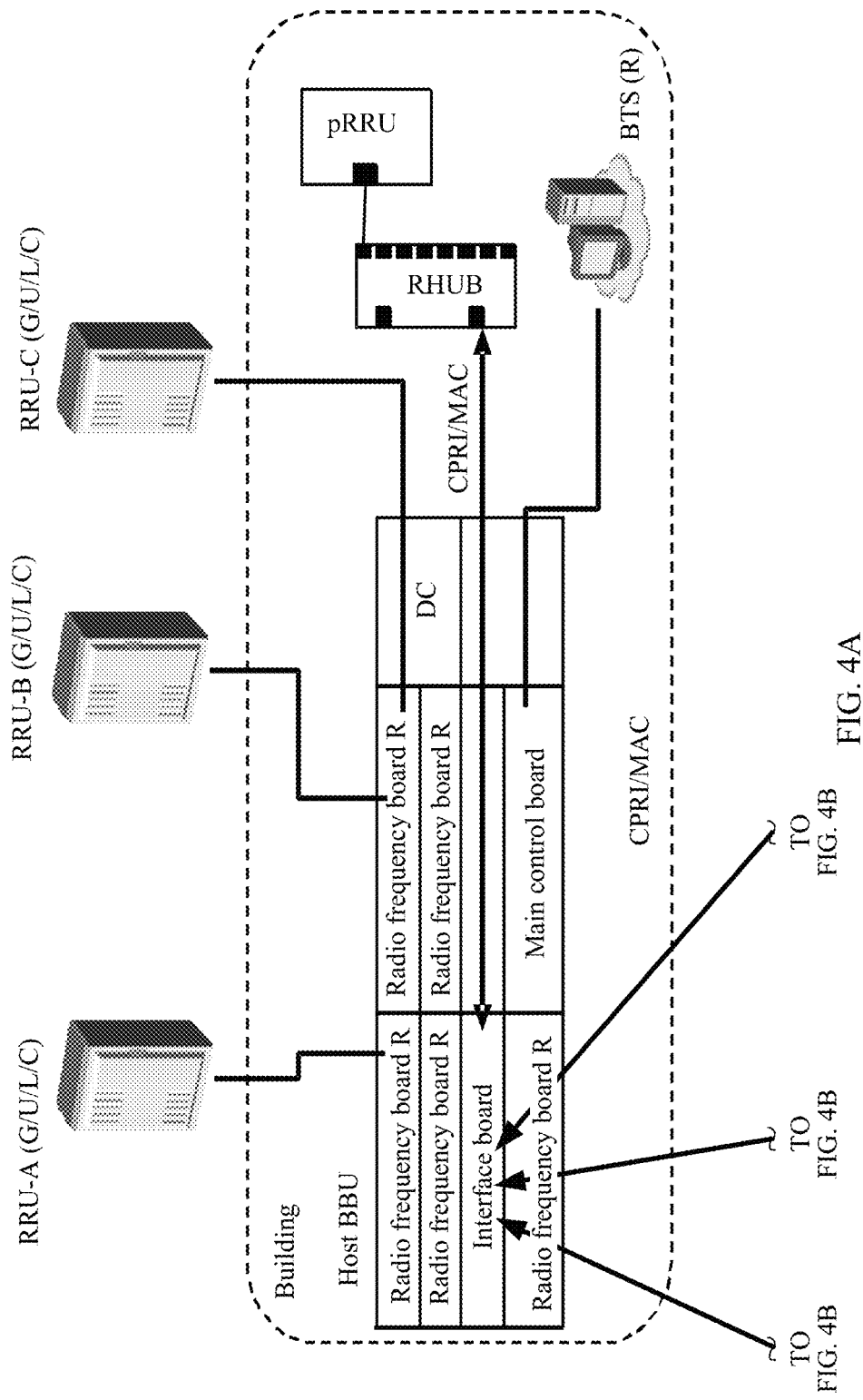
FIG. 4A and FIG. 4B are a schematic diagram of system architecture deployment of an integrated access system according to an embodiment of this application.
Figure 4B:
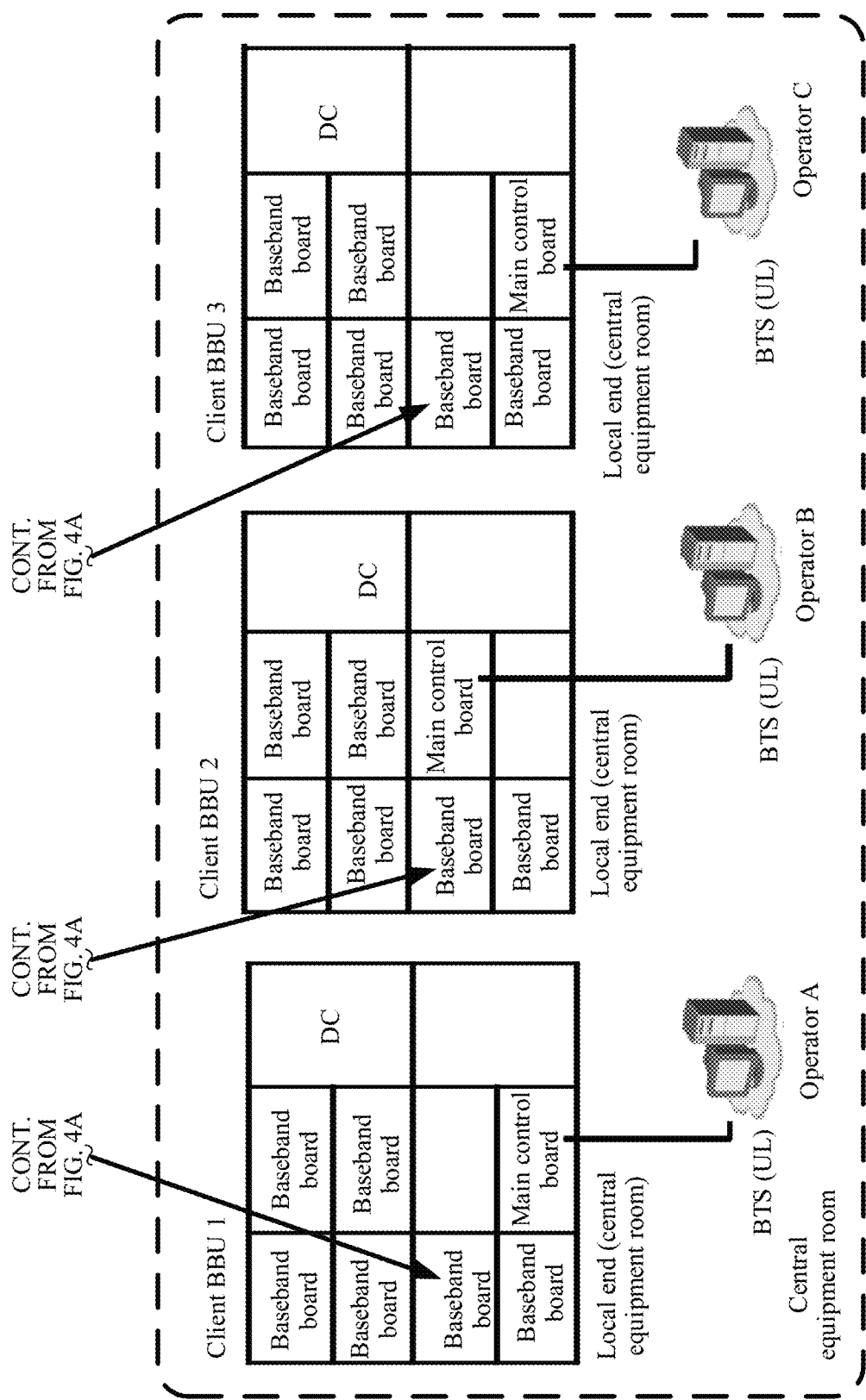

The clock configuration processes shown in FIG. 7 and FIG. 8 are described below by using an example. Referring to FIG. 4, clock synchronization between a host BBU and a client BBU is used as an example for description. In this embodiment of this application, inter-subrack clock soft synchronization based on panel CPRI interconnection may be implemented. To be specific, the host BBU transfers clock frequency and phase information of the host BBU to the client BBU through an inter-subrack fiber by using a CPRI frame or a MAC frame. A mode is first selected for a BBU. A mode of the first BBU is configured as a host BBU mode, and a mode of the second BBU is configured as a client BBU mode. In the integrated access system provided in this embodiment of this application, a BBU may be configured as a host BBU or a client BBU through an OM channel of a base station network management subsystem.

An indoor distributed unified network management subsystem is used to configure the host BBU. The host BBU obtains a clock from a local clock source of the host BBU, and broadcasts clock synchronization information to other client BBUs through an interconnection fiber (namely, a CPRI channel or a MAC channel). When a BBU is configured as a client BBU, the client BBU recovers a clock from an interconnection fiber (namely, a CPRI channel or a MAC channel). The client BBU uses the recovered clock as a reference clock source of the client BBU, to implement inter-subrack clock synchronization.

Figure 9:
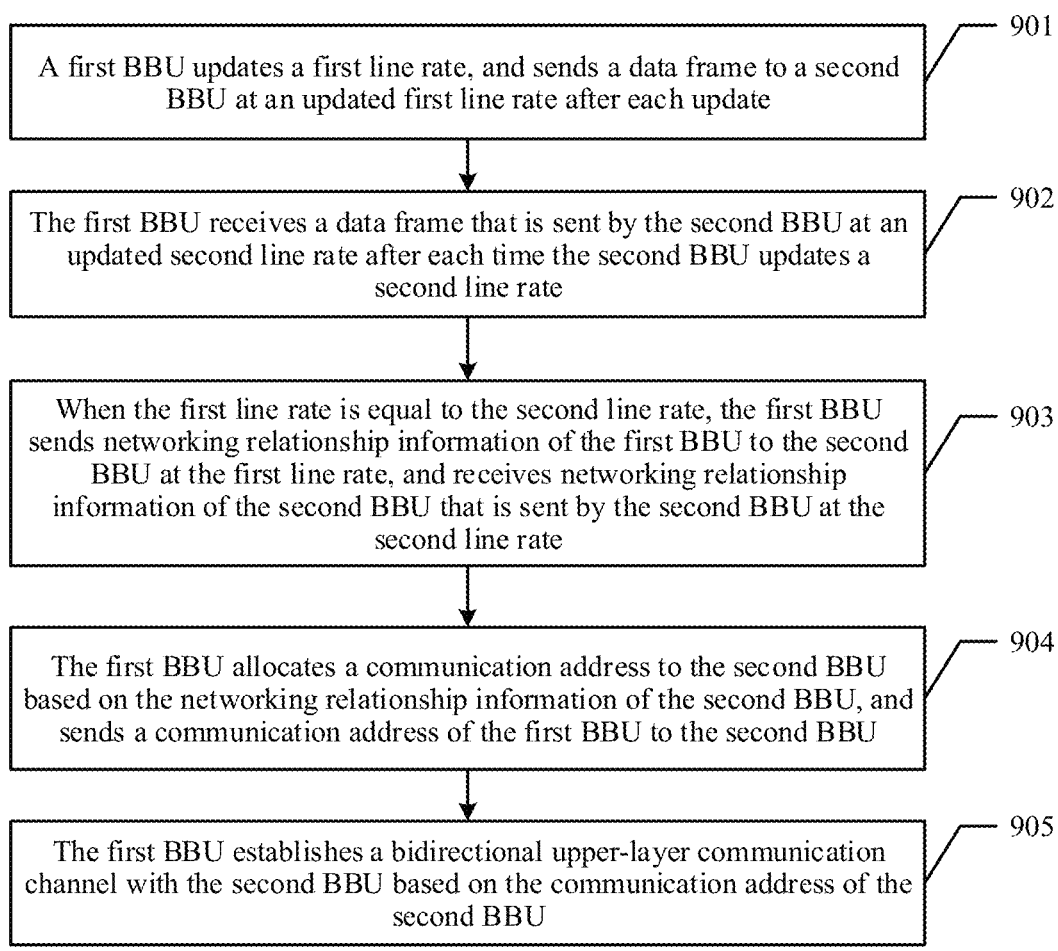
FIG. 9 is a schematic block flowchart of another configuration method based on an integrated access system according to an embodiment of this application.

The integrated access system provided in the embodiments of this application is described in the foregoing embodiments. A configuration method based on the integrated access system is described below. The method may be used to establish an upper-layer communication channel in the integrated access system. In the embodiments of this application, an upper-layer communication channel may be automatically established between a host BBU and a client BBU without manual configuration, thereby reducing manual costs and decreasing an error probability. A configuration method provided in an embodiment of this application is applicable to an integrated access system. As shown in FIG. 2, the integrated access system includes a first BBU and a second BBU. The first BBU is connected to the second BBU. For example, the first BBU and the second BBU are connected to each other through a fiber channel. As shown in FIG. 9, the configuration method provided in this embodiment of this application may include the following steps.

901. The first BBU updates a first line rate, and sends a data frame to the second BBU at an updated first line rate after each update.

A line rate used by the first BBU is defined as the "first line rate", and a line rate used by the second BBU is defined as a "second line rate". The line rate is a line rate of a physical layer channel. The first BBU constantly updates the first line rate, that is, the first BBU updates a rate value of the first line rate, and sends a data frame to the second BBU at an updated first line rate after each update. Similarly, the second BBU constantly updates the second line rate, that is, the second BBU updates a rate value of the second line rate, and after each update, sends an updated data frame that is based on the second line rate to the first BBU.

In some embodiments of this application, step 901 in which the first BBU updates the first line rate includes the following step:

D1. The first BBU updates the first line rate based on a first period, where the first period and a second period are different periods, and the second period is a period based on which the second BBU updates the second line rate.

Both the first BBU and the second BBU update respective line rate values based on respective periods, and the first period and the second period are different periods. Therefore, there is necessarily a longer period and a shorter period in the first period and the second period. The first BBU and the second BBU periodically update respective line rates, so as to attempt blind line rate matching between the first BBU and the second BBU, thereby implementing line rate auto-negotiation without occupying manual resources to perform manual configuration.

902. The first BBU receives a data frame that is sent by the second BBU at an updated second line rate after each time the second BBU updates the second line rate.

After each update, the second BBU sends an updated data frame that is based on the second line rate to the first BBU. Therefore, the second BBU constantly sends a data frame that is based on the second line rate to the first BBU through the fiber channel, and the first BBU receives the data frame that is based on the second line rate and that is constantly sent by the second BBU. The first BBU needs to determine whether the sent first line rate is equal to the received second line rate. If the two line rates are equal, a subsequent step 903 is triggered; or if the two line rates are unequal, step 901 and step 902 continue to be performed.

903. When the first line rate is equal to the second line rate, the first BBU sends networking relationship information of the first BBU to the second BBU at the first line rate, and receives networking relationship information of the second BBU that is sent by the second BBU at the second line rate.

When the first line rate sent by the first BBU is equal to the received second line rate, it indicates that rate negotiation between the first BBU and the second BBU is completed. In this case, the first BBU may send the networking relationship information of the first BBU to the second BBU at the first line rate, and receive the networking relationship information of the second BBU that is sent by the second BBU at the second line rate. The networking relationship information of the first BBU is a quantity of BBUs connected to the first BBU, and a port on an interface board connected to the first BBU. The networking relationship information of the second BBU is a quantity of BBUs connected to the second BBU, and a port on a baseband board or an interface board connected to the second BBU. The first BBU and the second BBU exchange the respective networking relationship information, so that the first BBU and the second BBU each can generate a network topology diagram based on the networking relationship information of the BBU. An inter-subrack connection relationship between a plurality of BBUs may be conveniently obtained by using the network topology diagram.

In some embodiments of this application, when the first line rate is equal to the second line rate, in addition to step 903, the method provided in this embodiment of this application may include the following steps:

E1. The first BBU sends line rate capability information of the first BBU to the second BBU at the first line rate.

E2. The first BBU receives line rate capability information of the second BBU that is sent by the second BBU at the second line rate.

E3. The first BBU determines, based on the line rate capability information of the first BBU and the line rate capability information of the second BBU, a line rate used for performing physical layer communication between the first BBU and the second BBU.

Line rate capability information is a maximum transmission capability of a BBU on a physical layer channel. The first BBU and the second BBU exchange the respective line rate capability information, and then determine, based on the line rate capability information of the first BBU and the line rate capability information of the second BBU, the line rate used for performing physical layer communication between the first BBU and the second BBU. For example, a maximum line rate in an intersection set of the line rate capability information of the first BBU and the line rate capability information of the second BBU may be selected as the line rate used for performing physical layer communication between the first BBU and the second BBU, so as to implement line rate auto-negotiation without occupying manual resources to perform manual configuration.

904. The first BBU allocates a communication address to the second BBU based on the networking relationship information of the second BBU, and sends a communication address of the first BBU to the second BBU.

In this embodiment of this application, after the first BBU and the second BBU exchange the respective networking relationship information, the first BBU allocates a communication address to the second BBU based on the networking relationship information of the second BBU, and sends the communication address of the first BBU to the second BBU, so that the second BBU can obtain the communication address of the first BBU. A communication address may be a location identifier of a location of a BBU.

905. The first BBU establishes a bidirectional upper-layer communication channel with the second BBU based on the communication address of the second BBU.

The first BBU allocates the communication address to the second BBU, the first BBU may obtain the communication address of the second BBU, and the second BBU may also obtain the communication address of the first BBU, so that the bidirectional upper-layer communication channel may be established between the two BBUs. The upper-layer communication channel may be used for mutual communication between the first BBU and the second BBU. For example, the first BBU allocates a resource to the second BBU based on the upper-layer communication channel.

It can be learned from the example description of an upper-layer communication channel establishment process shown in FIG. 9 that the first BBU and the second BBU may perform line rate auto-negotiation. The first BBU allocates the communication address to the second BBU, and the second BBU may obtain the communication address of the first BBU. The first BBU establishes the bidirectional upper-layer communication channel with the second BBU based on the communication address of the second BBU. Through line rate auto-negotiation, networking relationship information exchange, and communication address allocation, the upper-layer communication channel may be automatically established between the first BBU and the second BBU without manual configuration, thereby reducing manual costs and decreasing an error probability. For example, an upper-layer communication channel is automatically established between a host BBU and a client BBU, thereby reducing a configuration workload of service personnel and complexity of site setup.

Figure 10:
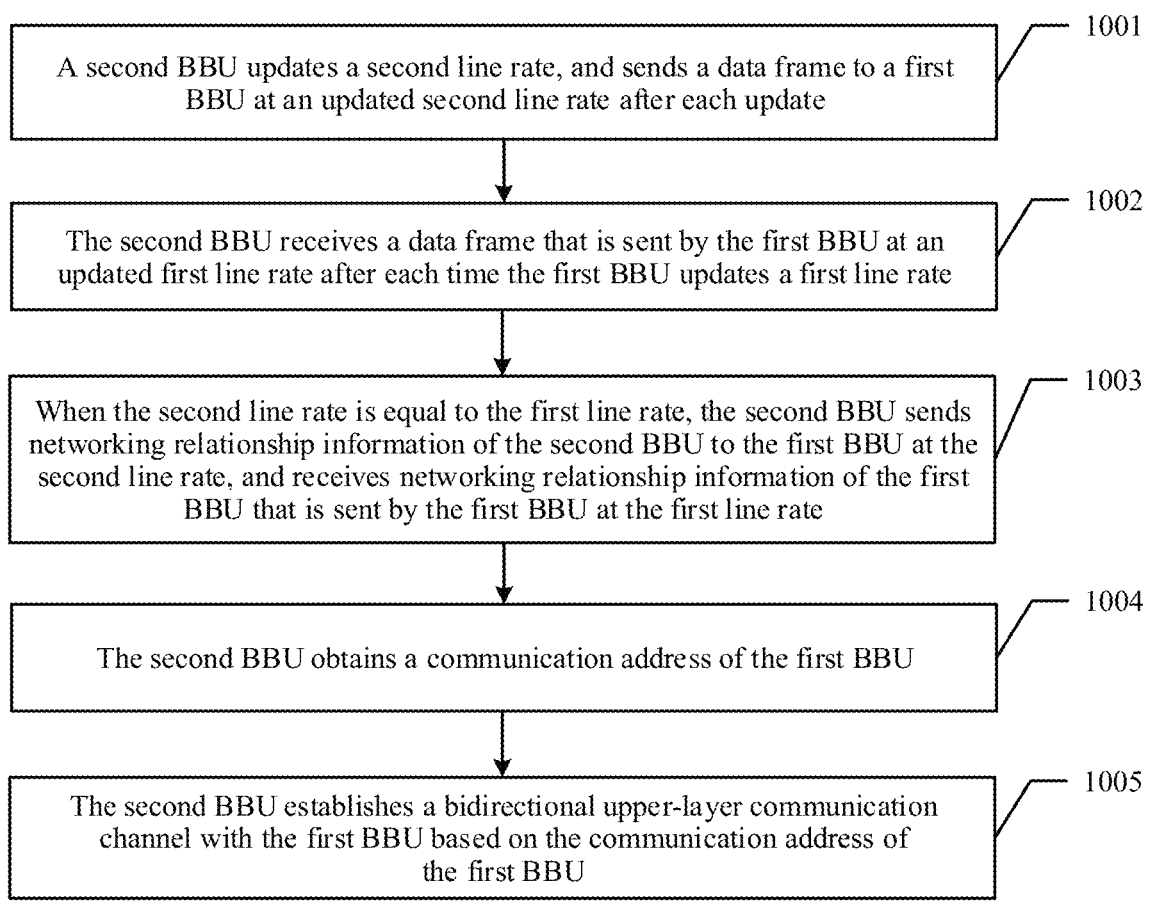
FIG. 10 is a schematic block flowchart of another configuration method based on an integrated access system according to an embodiment of this application.

The configuration method based on the integrated access system is described from a first BBU side in the foregoing embodiment, and the configuration method based on the integrated access system is described below from a second BBU side. The method may be used to establish an upper-layer communication channel in the integrated access system. In the embodiments of this application, an upper-layer communication channel may be automatically established between a host BBU and a client BBU without manual configuration, thereby reducing manual costs and decreasing an error probability. A configuration method provided in an embodiment of this application is applicable to an integrated access system. As shown in FIG. 2, the integrated access system includes a first BBU and a second BBU. The first BBU is connected to the second BBU. For example, the first BBU and the second BBU are connected to each other through a fiber channel. As shown in FIG. 10, the configuration method provided in this embodiment of this application may include the following steps.

1001. The second BBU updates a second line rate, and sends a data frame to the first BBU at an updated second line rate after each update.

A line rate used by the first BBU is defined as a "first line rate", and a line rate used by the second BBU is defined as the "second line rate". The line rate is a line rate of a physical layer channel. The first BBU constantly updates the first line rate, that is, the first BBU updates a rate value of the first line rate, and sends a data frame to the second BBU at an updated first line rate after each update. Similarly, the second BBU constantly updates the second line rate, that is, the second BBU updates a rate value of the second line rate, and after each update, sends an updated data frame that is based on the second line rate to the first BBU.

In some embodiments of this application, step 1001 in which the second BBU updates the second line rate includes the following step:

F1. The second BBU updates the second line rate based on a second period, where the second period and a first period are different periods, and the first period is a period based on which the first BBU updates the first line rate.

Both the first BBU and the second BBU update respective line rate values based on respective periods, and the first period and the second period are different periods. Therefore, there is necessarily a longer period and a shorter period in the first period and the second period. The first BBU and the second BBU periodically update respective line rates, so as to attempt blind line rate matching between the first BBU and the second BBU, thereby implementing line rate auto-negotiation without occupying manual resources to perform manual configuration.

1002. The second BBU receives a data frame that is sent by the first BBU at an updated first line rate after each time the first BBU updates the first line rate.

The first BBU sends a data frame to the second BBU at an updated first line rate after each update. Therefore, the first BBU constantly sends a data frame that is based on the first line rate to the second BBU through the fiber channel, and the second BBU receives the data frame that is based on the first line rate and that is constantly sent by the first BBU. The second BBU needs to determine whether the sent second line rate is equal to the received first line rate. If the two line rates are equal, a subsequent step 1003 is triggered; or if the two line rates are unequal, step 1001 and step 1002 continue to be performed.

1003. When the second line rate is equal to the first line rate, the second BBU sends networking relationship information of the second BBU to the first BBU at the second line rate, and receives networking relationship information of the first BBU that is sent by the first BBU at the first line rate.

When the second line rate sent by the second BBU is equal to the received first line rate, it indicates that rate negotiation between the first BBU and the second BBU is completed. In this case, the second BBU may send the networking relationship information of the second BBU to the first BBU at the second line rate, and receive the networking relationship information of the first BBU that is sent by the first BBU at the first line rate. The networking relationship information of the first BBU is a quantity of BBUs connected to the first BBU, and a port on an interface board connected to the first BBU. The networking relationship information of the second BBU is a quantity of BBUs connected to the second BBU, and a port on a baseband board or an interface board connected to the second BBU. The first BBU and the second BBU exchange the respective networking relationship information, so that the first BBU and the second BBU each can generate a network topology diagram based on the networking relationship information of the BBU. An inter-subrack connection relationship between a plurality of BBUs may be conveniently obtained by using the network topology diagram.

In some embodiments of this application, when the first line rate is equal to the second line rate, in addition to step 1003, the method provided in this embodiment of this application may include the following steps:

G1. The second BBU sends line rate capability information of the second BBU to the first BBU at the second rate.

G2. The second BBU receives line rate capability information of the first BBU that is sent by the first BBU at the first line rate.

G3. The second BBU determines, based on the line rate capability information of the second BBU and the line rate capability information of the first BBU, a line rate used for performing physical layer communication between the first BBU and the second BBU.

Line rate capability information is a maximum transmission capability of a BBU on a physical layer channel. The first BBU and the second BBU exchange the respective line rate capability information, and then determine, based on the line rate capability information of the first BBU and the line rate capability information of the second BBU, the line rate used for performing physical layer communication between the first BBU and the second BBU. For example, a maximum line rate in an intersection set of the line rate capability information of the first BBU and the line rate capability information of the second BBU may be selected as the line rate used for performing physical layer communication between the first BBU and the second BBU, so as to implement line rate auto-negotiation without occupying manual resources to perform manual configuration.

1004. The second BBU obtains a communication address of the first BBU.

In this embodiment of this application, after the first BBU and the second BBU exchange the respective networking relationship information, the first BBU allocates a communication address to the second BBU based on the networking relationship information of the second BBU, and sends the communication address of the first BBU to the second BBU, so that the second BBU can obtain the communication address of the first BBU. A communication address may be a location identifier of a location of a BBU.

1005. The second BBU establishes a bidirectional upper-layer communication channel with the first BBU based on the communication address of the first BBU.

The first BBU allocates the communication address to the second BBU, the first BBU may obtain the communication address of the second BBU, and the second BBU may also obtain the communication address of the first BBU, so that the bidirectional upper-layer communication channel may be established between the two BBUs. The upper-layer communication channel may be used for mutual communication between the first BBU and the second BBU. For example, the first BBU allocates a resource to the second BBU based on the upper-layer communication channel.

It can be learned from the example description of an upper-layer communication channel establishment process shown in FIG. 10 that the first BBU and the second BBU may perform line rate auto-negotiation. The first BBU allocates the communication address to the second BBU, and the second BBU may obtain the communication address of the first BBU. The first BBU establishes the bidirectional upper-layer communication channel with the second BBU based on the communication address of the second BBU. Through line rate auto-negotiation, networking relationship information exchange, and communication address allocation, the upper-layer communication channel may be automatically established between the first BBU and the second BBU without manual configuration, thereby reducing manual costs and decreasing an error probability.

Figure 11:
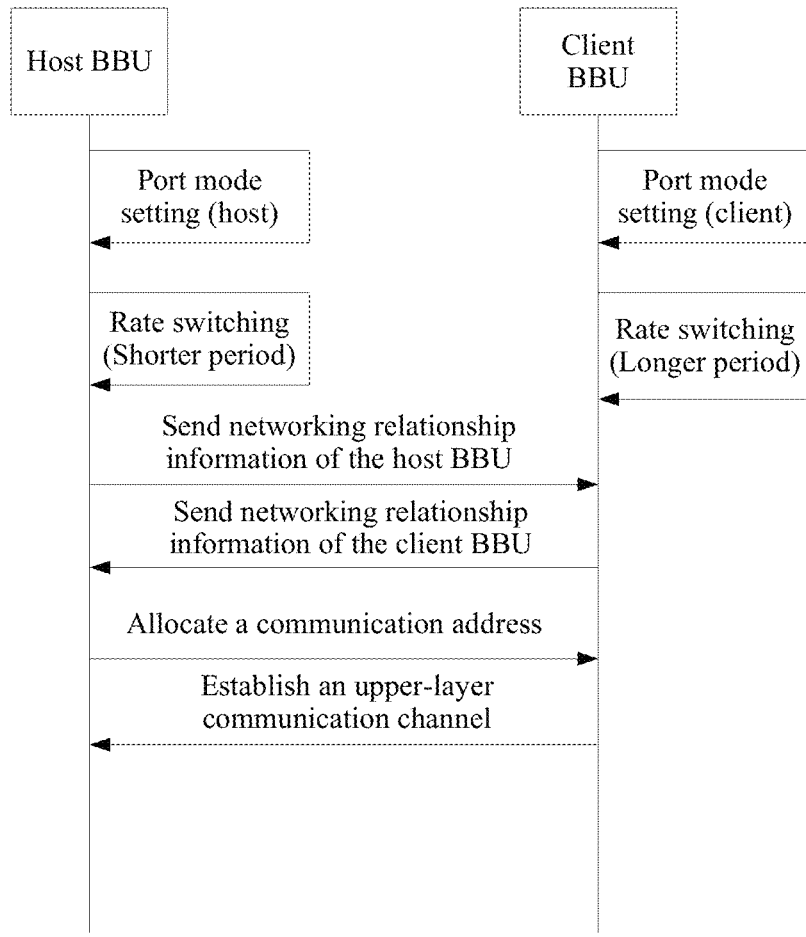
FIG. 11 is a schematic diagram of an application scenario of resource slicing based on an integrated access system according to an embodiment of this application.

The upper-layer communication channel establishment processes shown in FIG. 9 and FIG. 10 are described below by using an example. FIG. 11 shows a process of automatically establishing an upper-layer communication channel between a host BBU and a client BBU. A port mode of the host BBU is set to a host BBU mode, and a port mode of the client BBU is set to a client BBU mode. For example, a CPRI channel is used between the host BBU and the client BBU. The host BBU and the client BBU switch line rates of the CPRI channel based on different periods, to achieve line rate auto-negotiation, so that a line rate does not need to be configured, thereby reducing manual costs and decreasing an error probability. The host BBU and the client BBU exchanges networking relationship information by using a CPRI L1 control word, to implement autodiscovery of an internet topology. The host BBU allocates a communication address to the client BBU, and the two parties establish a bidirectional upper-layer communication channel on the discovered CPRI channel based on the given communication address, and a client interface channel does not need to be configured.

Figure 12:
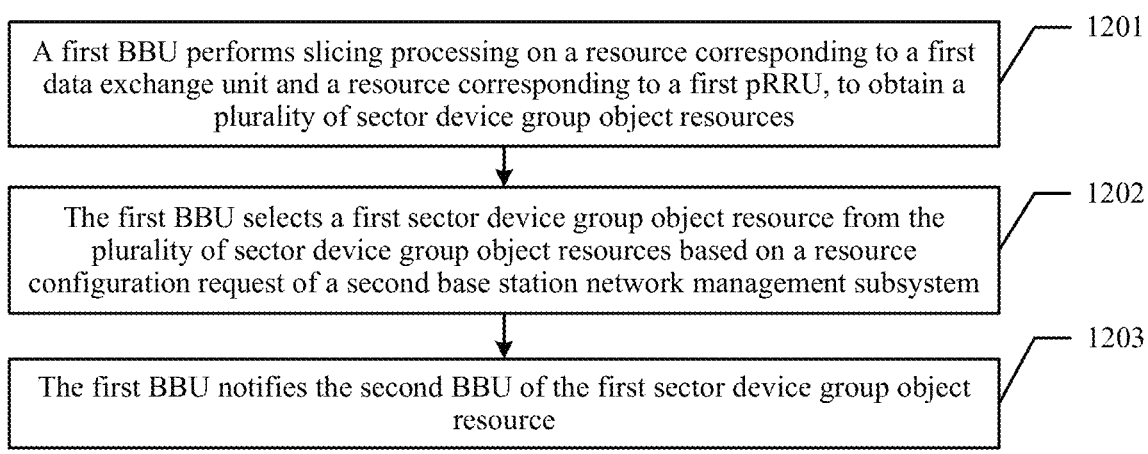
FIG. 12 is a schematic diagram of a resource configuration scenario between a first BBU and a second BBU according to an embodiment of this application.

The integrated access system provided in the embodiments of this application is described in the foregoing embodiments. A configuration method based on the integrated access system is described below. The method may be used to implement resource configuration in the integrated access system. In the embodiments of this application, a host BBU may allocate a resource to a client BBU. A configuration method provided in an embodiment of this application is applicable to an integrated access system. As shown in FIG. 2, the integrated access system includes a first BBU, a second BBU, a first data exchange unit, a second base station network management subsystem, and a first pRRU. The first BBU is separately connected to the second BBU and the first data exchange unit, the first data exchange unit is connected to the first pRRU, and the second BBU is connected to the second base station network management subsystem. As shown in FIG. 12, the configuration method provided in this embodiment of this application may include the following steps.

1201. The first BBU performs slicing processing on a resource corresponding to the first data exchange unit and a resource corresponding to the first pRRU, to obtain a plurality of sector device group object resources.

The first BBU is responsible for managing physical shared devices such as a data exchange unit (namely, an RHUB) and a pRRU. The first BBU may perform slicing processing on the resource corresponding to the first pRRU and the resource corresponding to the RHUB. For example, the first BBU virtualizes the resource corresponding to the first pRRU and the resource corresponding to the RHUB, to abstract the resources as resource objects. Then the first BBU performs slicing processing on the resource objects, and defines slice resources obtained after slicing processing as a plurality of sector device object resources. The sector device object resources are resource objects used for sending a same carrier signal through broadcast by one or more pRRUs in an indoor distributed integrated access system during downlink transmission, or resource objects of a same carrier signal that are formed through radio frequency combination during uplink transmission. For example, the first BBU serves as a host BBU, and is configured to manage a resource corresponding to an RHUB and a resource corresponding to a pRRU. The first BBU slices the resource corresponding to the RHUB into three radio frequency combination resource slices, and the first BBU slices a carrier resource corresponding to the pRRU into three carrier resource slices. In this case, a radio frequency combination resource slice of one RHUB and corresponding carrier resource slices in one or more pRRUs may be combined into one sector device group object resource. In the example scenario, the first BBU may generate three sector device group object resources.

In some embodiments of this application, the resource corresponding to the first data exchange unit includes a radio frequency combination cell capability resource and a transmission channel bandwidth resource, and the resource corresponding to the first pRRU includes a radio frequency resource. If the first BBU and the first data exchange unit are connected to each other through a CPRI channel, the transmission channel bandwidth resource is specifically a CPRI bandwidth resource. The radio frequency resource may include a network standard, a frequency band, transmit power, and a bandwidth. The radio frequency combination cell capability resource is a resource such as a quantity of radio frequency combination cells.

1202. The first BBU selects a first sector device group object resource from the plurality of sector device group object resources based on a resource configuration request of the second base station network management subsystem.

The first BBU is connected to the second BBU, and the second BBU is connected to the second base station network management subsystem. The first BBU may obtain the resource configuration request of the second base station network management subsystem by using the second BBU, and then the first BBU selects, for the second base station network management subsystem, the first sector device group object resource from the plurality of sector device group object resources. For example, the first BBU performs unified resource allocation on a first BBU side based on actual situations of operators. For example, an operator uses an LTE standard and a 20M bandwidth, and needs to establish two 20M physical cells. In this case, the first BBU may allocate a sector device group object resource to the operator based on a resource configuration of the operator.

1203. The first BBU notifies the second BBU of the first sector device group object resource.

In this embodiment of this application, after the first BBU selects the first sector device group object resource in step 1202, the first BBU notifies the second BBU of the first sector device group object resource. For example, a fiber channel is used between the first BBU and the second BBU, and the first BBU may notify the second BBU of the first sector device group object resource through the fiber channel. The second BBU invokes a resource allocated on the first BBU side and performs binding, for example, binds a radio frequency resource allocated on the first BBU side to a baseband resource on a second BBU side, to activate a corresponding BBU cell and a corresponding service. The first BBU performs slicing processing, so that operator devices can independently invoke common resources such as an RHUB and a pRRU.

In some embodiments of this application, in addition to the foregoing steps, the integrated access system provided in this embodiment of this application includes a third BBU and a third base station network management subsystem. As shown in FIG. 5, the first BBU is connected to the third BBU, the third BBU is connected to the third base station network management subsystem, and the method provided in this embodiment of this application further includes the following steps:

H1. The first BBU selects a second sector device group object resource from the plurality of sector device group object resources based on a resource configuration request of the third base station network management subsystem.

H2. The first BBU notifies the third BBU of the second sector device group object resource.

If the first BBU is connected to the second BBU and the third BBU through a fiber channel, the first BBU may further allocate the second sector device group object resource to the third base station network management subsystem based on the resource configuration request of the third base station network management subsystem, so that operator devices can independently invoke common resources such as an RHUB and a pRRU.

It can be learned from the example description of a resource configuration process shown in FIG. 12 that the first BBU performs slicing processing on the resource corresponding to the first data exchange unit and the resource corresponding to the first pRRU, to obtain the plurality of sector device group object resources. The first BBU allocates the first sector device group object resource to the second base station network management subsystem based on the resource configuration request of the second base station network management subsystem, so that operator devices can independently invoke common resources such as an RHUB and a pRRU.

Figure 13:
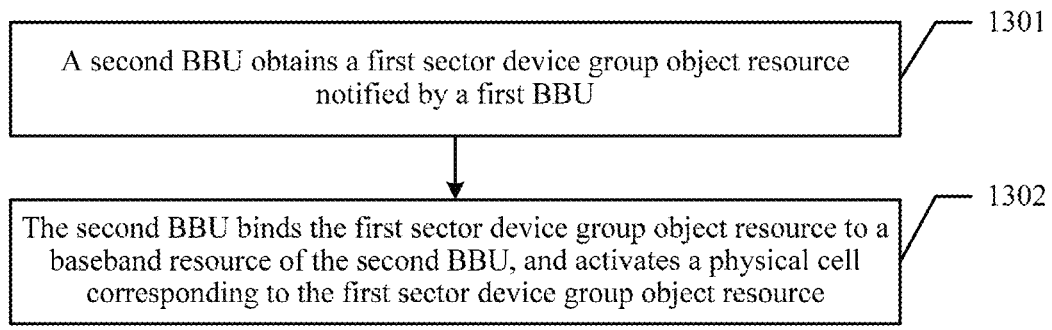
FIG. 13 is a schematic block flowchart of another configuration method based on an integrated access system according to an embodiment of this application.

The configuration method based on the integrated access system is described from a first BBU side in the foregoing embodiment, and the configuration method is described below from a second BBU side by using an example. The method may be used to implement resource configuration in the integrated access system. In the embodiments of this application, a host BBU may allocate a resource to a client BBU. A configuration method provided in an embodiment of this application is applicable to an integrated access system. As shown in FIG. 2, the integrated access system includes a first BBU, a second BBU, a first data exchange unit, a second base station network management subsystem, and a first pRRU. The first BBU is separately connected to the second BBU and the first data exchange unit, the first data exchange unit is connected to the first pRRU, and the second BBU is connected to the second base station network management subsystem. As shown in FIG. 13, the configuration method provided in this embodiment of this application may include the following steps:

1301. The second BBU obtains a first sector device group object resource notified by the first BBU.

1302. The second BBU binds the first sector device group object resource to a baseband resource of the second BBU, and activates a physical cell corresponding to the first sector device group object resource.

A fiber channel is used between the first BBU and the second BBU, and the first BBU may notify the second BBU of the first sector device group object resource through the fiber channel. The second BBU invokes a resource allocated on a first BBU side and performs binding, for example, binds a radio frequency resource allocated on the first BBU side to a baseband resource on a second BBU side, to activate a corresponding BBU cell and a corresponding service. The baseband resource herein is a physical cell resource on a base station side. The second BBU may use a corresponding sector device group object resource based on allocation of the first BBU, so that operator devices can independently invoke common resources such as an RHUB and a pRRU.

It can be learned from the example description of a resource configuration process shown in FIG. 13 that the second BBU obtains the first sector device group object resource notified by the first BBU, and the second BBU binds the first sector device group object resource to the baseband resource of the second BBU, and activates the physical cell corresponding to the first sector device group object resource, so that operator devices can independently invoke common resources such as an RHUB and a pRRU.

Figure 14:
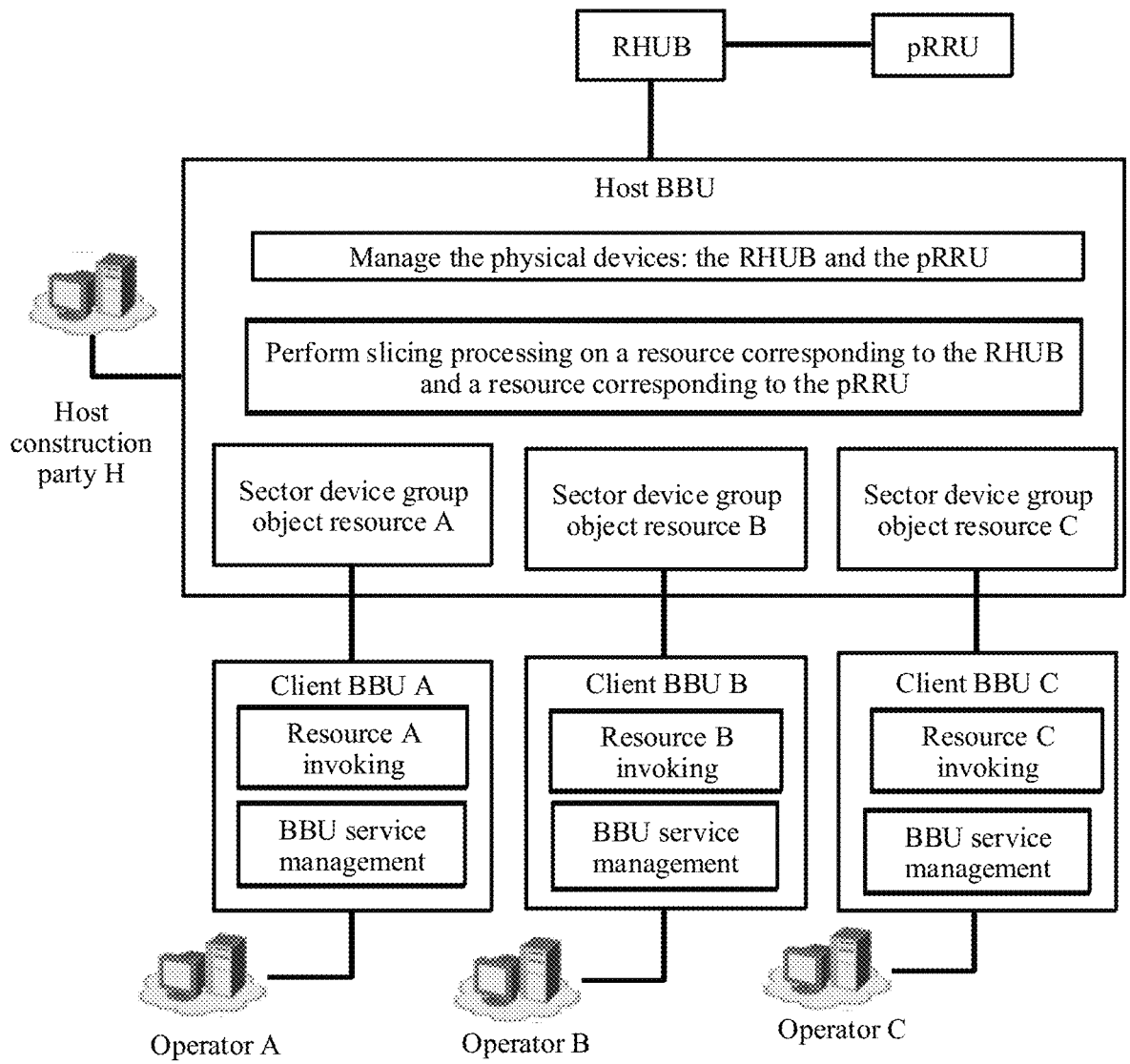
FIG. 14 is a schematic block flowchart of another configuration method based on an integrated access system according to an embodiment of this application.

The resource allocation processes shown in FIG. 12 and FIG. 13 are described below by using an example. FIG. 14 shows an example description of a resource allocation process between a host BBU and a client BBU. The host BBU is connected to a base station network management subsystem and an RHUB, and the RHUB is connected to a pRRU. The host BBU is connected to three client BBUs, which are respectively a client BBU A, a client BBU B, and a client BBU C. Each client BBU is connected to one base station network management subsystem. The host BBU is configured to manage the physical devices: the RHUB and the pRRU. The host BBU first performs slicing processing on a resource corresponding to the RHUB and a resource corresponding to the pRRU, to obtain a sector device group object resource A (which is referred to as a resource A for short in FIG. 14), a sector device group object resource B (which is referred to as a resource B for short in FIG. 14), and a sector device group object resource (which is referred to as a resource C for short in FIG. 14). The host BBU may allocate the resource A to the client BBU A for use. Therefore, the client BBU A may invoke the resource A, and then manage a BBU service based on the resource A.

The integrated access system provided in the embodiments of this application may support resource pooling and virtualization management on an RHUB and a pRRU connected to a host BBU. The host BBU is responsible for managing the physical devices: the RHUB and the pRRU, and virtualizing and slicing resource objects of the pRRU and the RHUB. The host BBU performs unified resource allocation on a client BBU side based on resource requests of operators. On the client BBU side, each client BBU invokes a resource allocated on the host BBU side and performs binding, for example, binds a radio frequency resource allocated on the host BBU side to a baseband resource on the client BBU side, to activate a corresponding BBU cell and a corresponding service. Through virtualization and slicing, operator devices can independently invoke common resources such as an RHUB and a pRRU.

A resource slicing procedure is described below by using an example. A host construction party (a host BBU) first collects network construction requirements of operators for a target site. Then the host BBU outputs a resource allocation result based on the network construction requirements of the operators and an actual site investigation. For example, physical device information such as quantities of pRRUs, RHUBs, and host BBUs are first collected. In addition, a specific pRRU physical position and unified planned resource requirements in network construction requirements of operators corresponding to each physical position are collected, for example, requirements for a network standard, a frequency, a bandwidth, transmit power, and a radio frequency combination cell. The host BBU is configured based on a resource design and plan. Resource slicing is performed for different operators by using a sector device group object (including a standard, a frequency, a bandwidth, transmit power, and pRRU radio frequency combination information). Each client BBU invokes a slice resource (namely, a sector device group object resource) allocated by the host BBU, and binds the sector device group object resource to a baseband resource of the client BBU, to establish and activate a corresponding physical cell, and activate a service.

Figure 15:
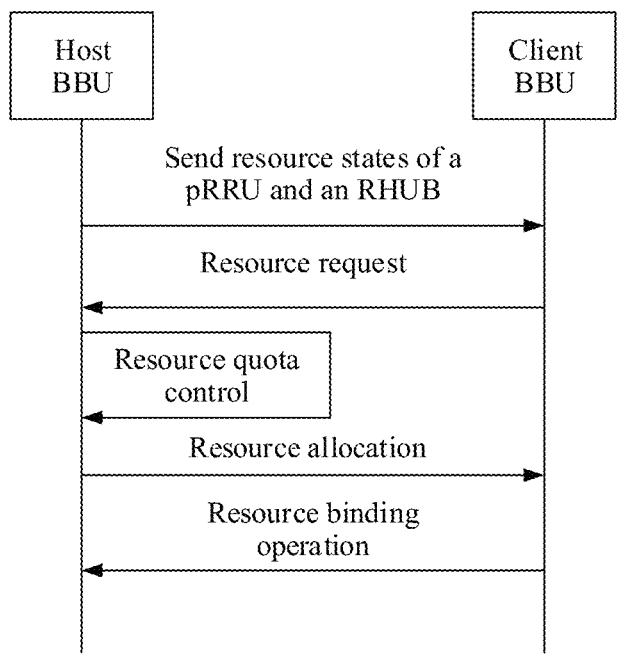
FIG. 15 is a schematic diagram of a scenario in which an upper-layer communication channel is configured between a first BBU and a second BBU according to an embodiment of this application.

Referring to FIG. 15, a process in which a host BBU allocates a resource to a client BBU is described below by using an example. The host BBU first sends resource states of a pRRU and an RHUB to the client BBU. The client BBU sends a resource request to the host BBU, and the host BBU performs resource quota control. The host BBU allocates a resource to the client BBU, and the client BBU uses the resource allocated by the host BBU to perform a resource binding operation. For details, refer to the description of resource binding in the foregoing embodiment. The host BBU allocates, based on a resource authorization configuration for a client BBU through an upper-layer communication channel, a resource corresponding to the pRRU and a resource corresponding to the RHUB that are available to an authorized client BBU. For example, the host BBU allocates a radio frequency resource and a network resource to the client BBU. The network resource includes a CPRI bandwidth capability, a radio frequency combination cell capability, and the like. In this embodiment of this application, a BBU can flexibly use a resource based on a service expansion requirement. The host BBU configures and limits a maximum quantity of resources used by the client BBU, to implement shared resource quota management and control.

It can be learned from the example description of the resource configuration process that in this embodiment of this application, a problem of operation and maintenance decoupling between a host construction party (a host BBU is configured by using a base station network management subsystem of the host BBU) and an operator (a client BBU is configured by using a base station network management subsystem of the client BBU), and operation and maintenance decoupling between operators may be resolved. The host construction party is mainly responsible for establishment of an indoor hardware network, focuses on establishment of a pRRU, an RHUB, and the host BBU, and does not participate in a specific service of a baseband cell. Operators separately manage respective client BBUs, and focus on respective BBU services, and operation and maintenance of the operators. Therefore, in this embodiment of this application, unified establishment, operation and maintenance of indoor distributed common systems are implemented, different service solutions provided by operators are decoupled, and service development of the operators is also decoupled. To be specific, an independent BBU version, cell, service characteristic, and the like are activated.

It should be noted that for brief description, the foregoing method embodiments are described as a series of actions. However, a person skilled in the art should appreciate that this application is not limited to the described order of the actions, because according to this application, some steps may be performed in another order or simultaneously. It should be further appreciated by a person skilled in the art that all the embodiments described in this specification are example embodiments, and the actions and modules are not necessarily required by this application.

To better implement the solutions of the embodiments of this application, related apparatuses for implementing the solutions are further provided below.

Figure 16:
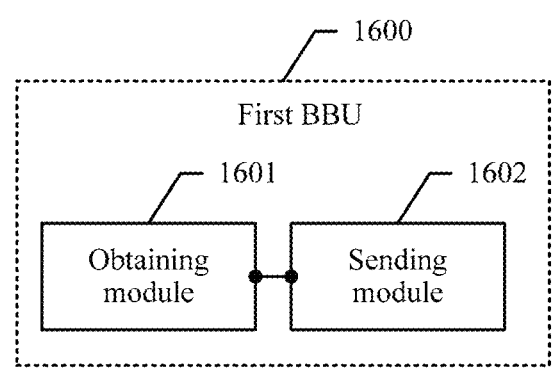
FIG. 16 is a schematic structural diagram of composition of a first BBU according to an embodiment of this application.

Referring to FIG. 16, an embodiment of this application provides a baseband unit BBU. The BBU is specifically a first BBU, and the first BBU belongs to an integrated access system. The integrated access system further includes a second BBU, and the first BBU is connected to the second BBU. The first BBU 1600 includes:

an obtaining module 1601, configured to obtain first clock synchronization information, where the first clock synchronization information includes a clock frequency and a clock phase of the first BBU; and a sending module 1602, configured to send the first clock synchronization information to the second BBU.

In some embodiments of this application, the integrated access system further includes a third BBU, the third BBU is connected to the first BBU, and the sending module 1602 is further configured to send the first clock synchronization information to the third BBU.

Referring to FIG. 17, an embodiment of this application provides a baseband unit BBU. The BBU is specifically a second BBU 1700, and the second BBU belongs to an integrated access system. The integrated access system further includes a first BBU, and the first BBU is connected to the second BBU. The second BBU 1700 includes:

a receiving module 1701, configured to receive first clock synchronization information sent by the first BBU, where the first clock synchronization information includes a clock frequency and a clock phase of the first BBU; and a configuration module 1702, configured to configure local clock information of the second BBU based on the first clock synchronization information.

In some embodiments of this application, the integrated access system further includes a fourth BBU, the fourth BBU is connected to the second BBU, and the receiving module 1701 is further configured to receive second clock synchronization information sent by the fourth BBU. The second clock synchronization information includes a clock frequency and a clock phase of the fourth BBU.

The configuration module 1702 is specifically configured to configure the local clock information of the second BBU based on the first clock synchronization information and the second clock synchronization information.

Further, in some embodiments of this application, the configuration module 1702 is specifically configured to: select clock synchronization information with higher clock quality from the first clock synchronization information and the second clock synchronization information, and configure the local clock information of the second BBU based on the clock synchronization information with higher clock quality.

Referring to FIG. 18-*a*, an embodiment of this application provides a baseband unit BBU. The BBU is specifically a first BBU 1800, and the first BBU belongs to an integrated access system. The integrated access system further includes a second BBU, and the first BBU is connected to the second BBU. The first BBU 1800 includes:

a line rate update module 1801, configured to: update a first line rate, and send a data frame to the second BBU at an updated first line rate after each update;

a receiving module 1802, configured to receive a data frame that is sent by the second BBU at an updated second line rate after each time the second BBU updates a second line rate;

a sending module 1803, configured to: when the first line rate is equal to the second line rate, send networking relationship information of the first BBU to the second BBU at the first line rate, and receive networking relationship information of the second BBU that is sent by the second BBU at the second line rate;

an address allocation module 1804, configured to: allocate a communication address to the second BBU based on the networking relationship information of the second BBU, and send a communication address of the first BBU to the second BBU; and a channel establishment module 1805, configured to establish a bidirectional upper-layer communication channel with the second BBU based on the communication address of the second BBU.

In some embodiments of this application, as shown in FIG. 18-*b*, when the first line rate is equal to the second line rate, the first BBU 1800 further includes a line rate determining module 1806.

The sending module 1803 is further configured to send line rate capability information of the first BBU to the second BBU at the first line rate.

The receiving module 1802 is further configured to receive line rate capability information of the second BBU that is sent by the second BBU at the second line rate.

The line rate determining module 1806 is configured to determine, based on the line rate capability information of the first BBU and the line rate capability information of the second BBU, a line rate used for performing physical layer communication between the first BBU and the second BBU.

Referring to FIG. 19-*a*, an embodiment of this application provides a baseband unit BBU. The BBU is specifically a second BBU 1900, and the second BBU belongs to an integrated access system. The integrated access system further includes a first BBU, and the first BBU is connected to the second BBU. The second BBU 1900 includes:

a line rate update module 1901, configured to: update a second line rate, and send a data frame to the first BBU at an updated second line rate after each update;

a receiving module 1902, configured to receive a data frame that is sent by the first BBU at an updated first line rate after each time the first BBU updates a first line rate;

a sending module 1903, configured to: when the second line rate is equal to the first line rate, send, by the second BBU, networking relationship information of the second BBU to the first BBU at the second line rate, and receive networking relationship information of the first BBU that is sent by the first BBU at the first line rate;

an address obtaining module 1904, configured to obtain a communication address of the first BBU; and a channel establishment module 1905, configured to establish a bidirectional upper-layer communication channel with the first BBU based on the communication address of the first BBU.

In some embodiments of this application, as shown in FIG. 19-*b*, when the second line rate is equal to the first line rate, the second BBU 1900 further includes a line rate determining module 1906.

The sending module 1903 is further configured to send line rate capability information of the second BBU to the first BBU at the second rate.

The receiving module 1902 is further configured to receive line rate capability information of the first BBU that is sent by the first BBU at the first line rate.

The line rate determining module 1906 is configured to determine, based on the line rate capability information of the second BBU and the line rate capability information of the first BBU, a line rate used for performing physical layer communication between the first BBU and the second BBU.

Referring to FIG. 20, an embodiment of this application provides a baseband unit BBU. The BBU is specifically a first BBU 2000, and the first BBU belongs to an integrated access system. The integrated access system further includes a second BBU, a first data exchange unit, a second base station network management subsystem, and a first pico remote radio unit pRRU. The first BBU is separately connected to the second BBU and the first data exchange unit, the first data exchange unit is connected to the first pRRU, and the second BBU is connected to the second base station network management subsystem. The first BBU 2000 includes:

a slicing module 2001, configured to perform slicing processing on a resource corresponding to the first data exchange unit and a resource corresponding to the first pRRU, to obtain a plurality of sector device group object resources;

a resource allocation module 2002, configured to select a first sector device group object resource from the plurality of sector device group object resources based on a resource configuration request of the second base station network management subsystem; and a notification module 2003, configured to notify the second BBU of the first sector device group object resource.

In some embodiments of this application, the integrated access system further includes a third BBU and a third base station network management subsystem. The first BBU is connected to the third BBU, and the third BBU is connected to the third base station network management subsystem.

The resource allocation module 2002 is further configured to select a second sector device group object resource from the plurality of sector device group object resources based on a resource configuration request of the third base station network management subsystem.

The notification module 2003 is further configured to notify the third BBU of the second sector device group object resource.

Figure 21:
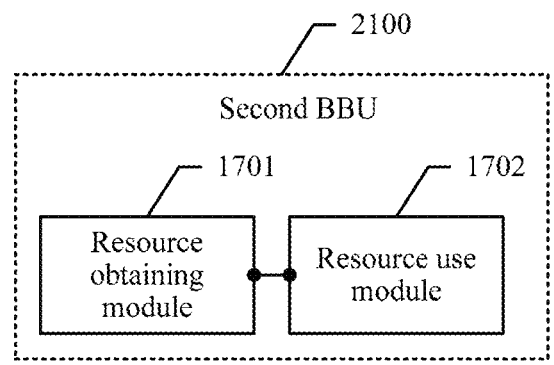
FIG. 21 is a schematic structural diagram of composition of another second BBU according to an embodiment of this application.

Referring to FIG. 21, an embodiment of this application provides a baseband unit BBU. The BBU is specifically a second BBU 2100, and the second BBU belongs to an integrated access system. The integrated access system further includes a first BBU, a second BBU, a first data exchange unit, a second base station network management subsystem, and a first pico remote radio unit pRRU. The first BBU is separately connected to the second BBU and the first data exchange unit, the first data exchange unit is connected to the first pRRU, and the second BBU is connected to the second base station network management subsystem. The second BBU 2100 includes:

a resource obtaining module 2101, configured to obtain a first sector device group object resource notified by the first BBU; and a resource use module 2102, configured to: bind the first sector device group object resource to a baseband resource of the second BBU, and activate a physical cell corresponding to the first sector device group object resource.

It should be noted that content such as information exchange between the modules/units of the apparatus and the execution processes thereof is based on the same idea as the method embodiments of this application, and produces the same technical effects as the method embodiments of this application. For the specific content, refer to the foregoing descriptions in the method embodiments of this application. Details are not described herein again.

An embodiment of this application further provides a computer storage medium. The computer storage medium stores a program. In the program, some or all of the steps recorded in the foregoing method embodiments are performed.

Figure 22:
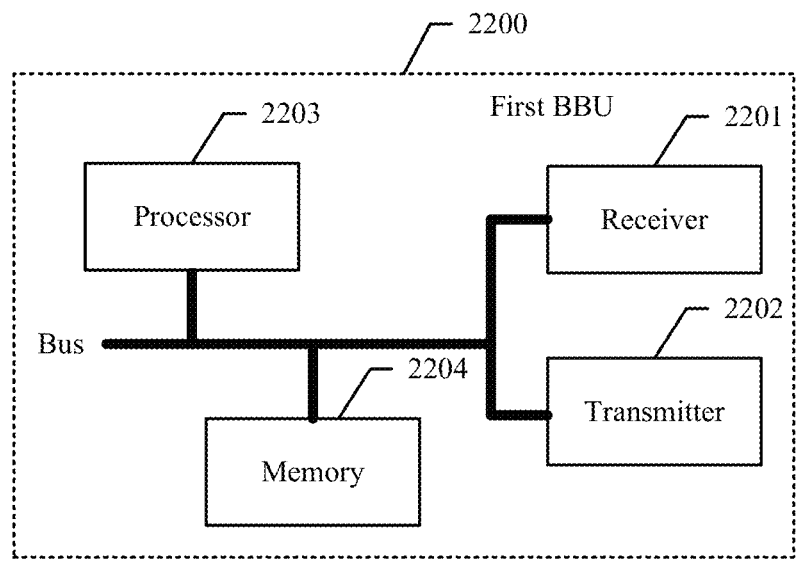
FIG. 22 is a schematic structural diagram of composition of another first BBU according to an embodiment of this application.

Another first BBU provided in an embodiment of this application is described below. Referring to FIG. 22, a first BBU 2200 includes:

a receiver 2201, a transmitter 2202, a processor 2203, and a memory 2204 (there may be one or more processors 2203 in the first BBU 2200, and one processor is used as an example in FIG. 22). In some embodiments of this application, the receiver 2201, the transmitter 2202, the processor 2203, and the memory 2204 may be connected by using a bus or in another manner, and connecting by using the bus is used as an example in FIG. 22.

The memory 2204 may include a read-only memory and a random access memory, and provide an instruction and data to the processor 2203. A part of the memory 2204 may further include a non-volatile random access memory (NVRAM). The memory 2204 stores an operating system and an operation instruction, an executable module or a data structure, or a subset thereof, or an extended set thereof. The operation instruction may include various operation instructions for implementing various operations. The operating system may include various system programs for implementing various basic services and processing hardware-based tasks.

The processor 2203 controls an operation of the first BBU, and the processor 2203 may also be referred to as a central processing unit (CPU). In specific application, components of the first BBU are coupled by using a bus system. In addition to a data bus, the bus system may include a power bus, a control bus, and a status signal bus. However, for clear description, various types of buses in the figure are marked as the bus system.

The methods disclosed in the foregoing embodiments of this application may be applied to the processor 2203, or may be implemented by the processor 2203. The processor 2203 may be an integrated circuit chip and has a signal processing capability. In an implementation process, steps in the foregoing methods can be implemented by using a hardware integrated logical circuit in the processor 2203 or by using instructions in a form of software. The processor 2203 may be a general purpose processor, a digital signal processor (DSP), an application-specific integrated circuit (ASIC), a field-programmable gate array (FPGA) or another programmable logic device, a discrete gate or transistor logic device, or a discrete hardware component. The processor 2203 may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly performed and completed by a hardware decoding processor, or may be performed and completed by using a combination of hardware and software modules in a decoding processor. A software module may be located in a mature storage medium in the art, such as a random access memory, a flash memory, a read-only memory, a programmable read-only memory, an electrically erasable programmable memory, a register, or the like. The storage medium is located in the memory 2204, and the processor 2203 reads information in the memory 2204 and completes the steps in the foregoing methods in combination with hardware of the processor.

In this embodiment of this application, the processor 2203 is configured to perform the method steps performed by the first BBU.

Figure 23:
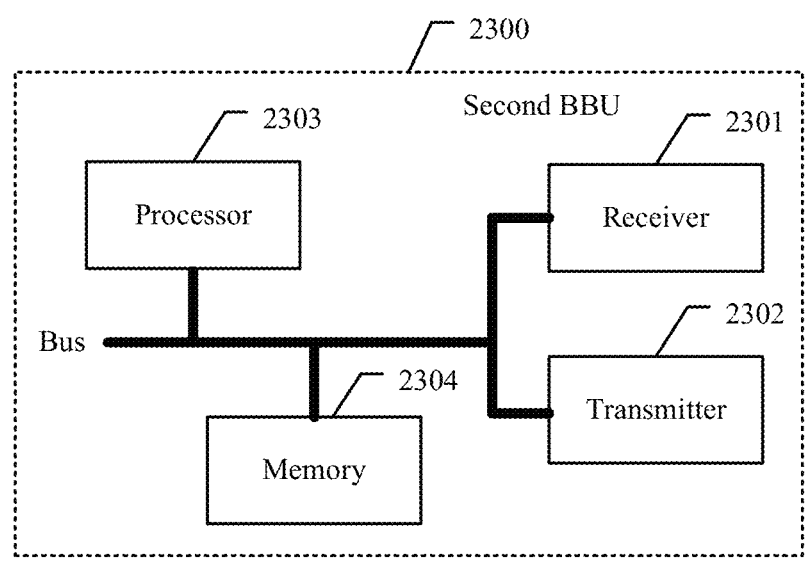
FIG. 23 is a schematic structural diagram of composition of another second BBU according to an embodiment of this application.

Another second BBU provided in an embodiment of the present invention is described below. Referring to FIG. 23, a second BBU 2300 includes:

a receiver 2301, a transmitter 2302, a processor 2303, and a memory 2304 (there may be one or more processors 2303 in the second BBU 2300, and one processor is used as an example in FIG. 23). In some embodiments of the present invention, the receiver 2301, the transmitter 2302, the processor 2303, and the memory 2304 may be connected by using a bus or in another manner, and connecting by using the bus is used as an example in FIG. 23.

The memory 2304 may include a read-only memory and a random access memory, and provide an instruction and data to the processor 2303. A part of the memory 2304 may further include an NVRAM. The memory 2304 stores an operating system and an operation instruction, an executable module or a data structure, or a subset thereof, or an extended set thereof. The operation instruction may include various operation instructions for implementing various operations. The operating system may include various system programs for implementing various basic services and processing hardware-based tasks.

The processor 2303 controls an operation of the second BBU. The processor 2303 may also be referred to as a CPU. In specific application, components of the second BBU are coupled by using a bus system. In addition to a data bus, the bus system may include a power bus, a control bus, and a status signal bus. However, for clear description, various types of buses in the figure are marked as the bus system.

The methods disclosed in the foregoing embodiments of the present invention may be applied to the processor 2303, or may be implemented by the processor 2303. The processor 2303 may be an integrated circuit chip and has a signal processing capability. In an implementation process, steps in the foregoing methods can be implemented by using a hardware integrated logical circuit in the processor 2303 or by using instructions in a form of software. The processor 2303 may be a general purpose processor, a DSP, an ASIC, an FPGA or another programmable logic device, a discrete gate or transistor logic device, or a discrete hardware component. The processor 2303 may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly performed and completed by a hardware decoding processor, or may be performed and completed by using a combination of hardware and software modules in a decoding processor. A software module may be located in a mature storage medium in the art, such as a random access memory, a flash memory, a read-only memory, a programmable read-only memory, an electrically erasable programmable memory, a register, or the like. The storage medium is located in the memory 2304, and the processor 2303 reads information in the memory 2304 and completes the steps in the foregoing methods in combination with hardware of the processor.

In this embodiment of the present invention, the processor 2303 is configured to perform the method steps performed by the second BBU.

In addition, it should be noted that the described apparatus embodiment is merely an example. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided in this application, connection relationships between modules indicate that the modules have communication connections with each other, which may be specifically implemented as one or more communications buses or signal cables. A person of ordinary skill in the art may understand and implement the embodiments of the present invention without creative efforts.

Based on the descriptions of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for this application, software program implementation is a better implementation in most cases. Based on such an understanding, the technical solutions of this application essentially or the part contributing to the prior art may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of this application.

All or some of the foregoing embodiments may be implemented through software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedures or functions according to the embodiments of this application are all or partially generated. The computer may be a general purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive Solid State Disk (SSD)), or the like.

What is claimed is:

1. An integrated access system, comprising a first baseband unit (BBU), a second BBU, a first data exchange unit, a first base station network management subsystem, a second base station network management subsystem, and a first pico remote radio unit (pRRU), wherein:
   the first BBU is connected to the first data exchange unit, the first base station network management subsystem, and the second BBU;
   the second BBU is connected to the second base station network management subsystem, wherein the second BBU invokes the first pRRU to use a radio frequency resource allocated by the first BBU for the second BBU;
   the first base station network management subsystem is configured to manage the radio frequency resource of the first BBU;
   the second base station network management subsystem is configured to manage a baseband resource of the second BBU; and
   the first pRRU is connected to the first data exchange unit.

2. The integrated access system according to claim 1, wherein the integrated access system further comprises a third BBU and a third base station network management subsystem;
   wherein the first BBU is connected to the third BBU; and
   wherein the third BBU is connected to the third base station network management subsystem.

3. The integrated access system according to claim 1, wherein the integrated access system further comprises a fourth BBU, a second data exchange unit, a fourth base station network management subsystem, and a second pRRU;
   wherein the fourth BBU is connected to the second data exchange unit, the fourth base station network management subsystem, and the second BBU; and
   wherein the second pRRU is connected to the second data exchange unit.

4. A configuration method based on an integrated access system, wherein the integrated access system comprises a first baseband unit (BBU) and a second BBU, wherein the first BBU is connected to the second BBU, wherein the first BBU is connected to a first base station network management subsystem that is configured to manage a radio frequency resource of the first BBU, wherein the second BBU is connected to a second base station network management subsystem that is configured to manage a baseband resource of the second BBU, wherein the second BBU invokes a first pico remote radio unit (pRRU) to use the radio frequency resource allocated by the first BBU for the second BBU, and wherein the method comprises:

obtaining, by the first BBU, first clock synchronization information, wherein the first clock synchronization information comprises a clock frequency and a clock phase of the first BBU; and sending, by the first BBU, the first clock synchronization information to the second BBU.

5. The method according to claim 4, wherein the integrated access system further comprises a third BBU, wherein the third BBU is connected to the first BBU, and wherein the method further comprises:

sending, by the first BBU, the first clock synchronization information to the third BBU.

6. A configuration method based on an integrated access system, wherein the integrated access system comprises a first baseband unit (BBU) and a second BBU, wherein the first BBU is connected to the second BBU, wherein the first BBU is connected to a first base station network management subsystem that is configured to manage a radio frequency resource of the first BBU, wherein the second BBU is connected to a second base station network management subsystem that is configured to manage a baseband resource of the second BBU, wherein the second BBU invokes a first pico remote radio unit (pRRU) to use the radio frequency resource allocated by the first BBU for the second BBU, and wherein the method comprises:

receiving, by the second BBU, first clock synchronization information sent by the first BBU, wherein the first clock synchronization information comprises a clock frequency and a clock phase of the first BBU; and configuring, by the second BBU, local clock information of the second BBU based on the first clock synchronization information.

7. The method according to claim 6, wherein the integrated access system further comprises a fourth BBU, wherein the fourth BBU is connected to the second BBU, and wherein the method further comprises:

receiving, by the second BBU, second clock synchronization information sent by the fourth BBU, wherein the second clock synchronization information comprises a clock frequency and a clock phase of the fourth BBU; and wherein the configuring, by the second BBU, local clock information of the second BBU based on the first clock synchronization information comprises:

configuring, by the second BBU, the local clock information of the second BBU based on the first clock synchronization information and the second clock synchronization information.

8. The method according to claim 7, wherein the configuring, by the second BBU, the local clock information of the second BBU based on the first clock synchronization information and the second clock synchronization information comprises:

selecting, by the second BBU, clock synchronization information with higher clock quality from the first clock synchronization information and the second clock synchronization information; and configuring the local clock information of the second BBU based on the clock synchronization information with higher clock quality.

9. A system, comprising:
a first baseband unit (BBU), wherein the first BBU is connected to a first base station network management subsystem that is configured to manage a radio frequency resource of the first BBU;

a second BBU, wherein the first BBU is connected to the second BBU, wherein the second BBU is connected to a second base station network management subsystem that is configured to manage a baseband resource of the second BBU, wherein the second BBU invokes a first pico remote radio unit (pRRU) to use the radio frequency resource allocated by the first BBU for the second BBU;

at least one processor; and one or more memories coupled to the at least one processor and storing programming instructions for execution by the at least one processor to instruct the first BBU to:

obtain first clock synchronization information, wherein the first clock synchronization information comprises a clock frequency and a clock phase of the first BBU; and send the first clock synchronization information to the second BBU; and wherein the one or more memories store the programming instructions for execution by the at least one processor to instruct the second BBU to:

receive first clock synchronization information sent by the first BBU; and configure local clock information of the second BBU based on the first clock synchronization information.

10. The system according to claim 9, wherein the system further comprises a third BBU, wherein the third BBU is connected to the first BBU, and wherein the one or more memories store the programming instructions for execution by the at least one processor to instruct the first BBU to:

send the first clock synchronization information to the third BBU.

11. The system according to claim 9, wherein the system further comprises a fourth BBU, wherein the fourth BBU is connected to the second BBU, and wherein the one or more memories store the programming instructions for execution by the at least one processor to instruct the second BBU to:

receive second clock synchronization information sent by the fourth BBU, wherein the second clock synchronization information comprises a clock frequency and a clock phase of the fourth BBU; and wherein the configure local clock information of the second BBU based on the first clock synchronization information comprises:

configure the local clock information of the second BBU based on the first clock synchronization information and the second clock synchronization information.

12. The system according to claim 11, wherein the configure the local clock information of the second BBU based on the first clock synchronization information and the second clock synchronization information comprises:

select clock synchronization information with higher clock quality from the first clock synchronization information and the second clock synchronization information; and configure the local clock information of the second BBU based on the clock synchronization information with higher clock quality.

* * * * *